(12) United States Patent
Luca

(10) Patent No.: US 7,311,840 B2
(45) Date of Patent: Dec. 25, 2007

(54) INORGANIC ION EXCHANGERS FOR REMOVING CONTAMINANT METAL IONS FROM LIQUID STREAMS

(75) Inventor: Vittorio Luca, Narellan Vale (AU)

(73) Assignee: Australian Nuclear Science and Technology Organisation, Lucas Heights, NSW (AU)

( * ) Notice: Subject to any disclaimer, the term of this patent is extended or adjusted under 35 U.S.C. 154(b) by 512 days.

(21) Appl. No.: 10/479,540

(22) PCT Filed: May 31, 2001

(86) PCT No.: PCT/AU01/00645

§ 371 (c)(1),
(2), (4) Date: Jun. 10, 2004

(87) PCT Pub. No.: WO02/096559

PCT Pub. Date: Dec. 5, 2002

(65) Prior Publication Data

US 2006/0249461 A1 Nov. 9, 2006

(51) Int. Cl.
*B01D 15/00* (2006.01)
(52) U.S. Cl. ............... 210/660; 210/683; 210/688; 210/263; 210/912
(58) Field of Classification Search ........... 210/660, 210/683, 688, 263, 912
See application file for complete search history.

(56) References Cited

U.S. PATENT DOCUMENTS 5,741,540 A * 4/1998 Li et al. ............... 427/126.3

* cited by examiner

*Primary Examiner*—Chester T. Barry
(74) *Attorney, Agent, or Firm*—Medlen & Carroll, LLP

(57) ABSTRACT

The invention relates to processes and compositions for at least partially removing cations of one or more metals selected from the group consisting of caesium, strontium, lead, silver, transition metals, lanthanides and actinides from a liquid containing the cations. The process comprises contacting the liquid with a sorbent material in an amount and for a time sufficient to at least reduce the concentration of the cations, wherein the sorbent material is a metal oxide composition having the empirical formula $A_{x/n}[B_yM_{1-y}O_{3+\delta}]^x \cdot ZH_2O$ where M is one or more metals of Group Vb or VIb of the Periodic Table; A is a cation selected from the group consisting of alkali metals, alkaline earth metals, silver, ammonium, hydrogen and mixtures thereof; n is the charge on the cation A; B is one or more elements selected from the group consisting of W, Zr, Mo, V, Ti, Fe, Ce, Sb, Nb, Mn, Co, Cr, Fe, Ta, Sn and Cu, provided that M and B are different; x represents the quantity of framework charge; y is a number in the range of 0 to about 0.5; Z is a number in the range 0 to 3; and 3+δ indicates the oxygen stoichiometry. Preferably, y is greater than zero.

49 Claims, 14 Drawing Sheets a b

INORGANIC ION EXCHANGERS FOR REMOVING CONTAMINANT METAL IONS FROM LIQUID STREAMS

This application is a U.S. national entry of International Application No. PCT/AU01/00645, filed May 31, 2001.

TECHNICAL FIELD

The present invention relates to inorganic sorbents and processes for removing contaminant metal ions from liquids including liquid waste streams, using such inorganic sorbents. In particular, the invention relates to porous metal oxide sorbent materials and their use in processes for removing contaminant metal ions from liquids. The use of tungsten and niobium based porous compounds as sorbent materials and the use of such compounds as Cs and Sr selective inorganic sorbents is also disclosed.

BACKGROUND OF THE INVENTION

Ion exchange treatment (defined as $A+BX \Leftrightarrow B+AX$, where A and B are both cations or both anions) typically involves the interchange/sorption of ionic species between a liquid phase (containing the contaminant) and a suitable solid phase using batch or continuous flow processes, until the specific sites available for ion exchange/sorption in the solid phase become saturated, and in the case of the continuous process, the contaminant/toxic ions appear in the eluant. Treatment is then stopped, and the contaminant ions present on the solid phase are subsequently exchanged with other ions. In this way the contaminant ions are recovered and the exchanger is regenerated.

Inorganic sorbents are used extensively in industry and in research areas such as radiochemistry, geochemistry, and radiopharmaceuticals. Many of their industrial applications are within the broad context of waste remediation, particularly in areas such as nuclear waste decontamination, mine tailings management, and various hydrometallurgical separations.

A particular application of inorganic sorbents is as ion exchangers in the decontamination of liquid nuclear wastes, such as for example those formed during the dissolution of fuel elements using strong acids. These liquid nuclear wastes are usually stored in underground stainless steel tanks. Typically in legacy wastes, that is those wastes which have been stored for times typically exceeding about 5 years, $^{137}$Cs and $^{90}$Sr are the radionuclides responsible for most of the radioactivity (with minor contributions from $^{99}$Tc and $^{106}$Ru). Such wastes can result from weapons development and power generation activities. Being highly soluble, Cs and Sr can easily become mobilised and find their way into the biosphere representing a significant danger to public health. It is therefore highly desirable to remove such radioactive elements selectively from the nuclear waste streams, particularly at the pre-treatment stage, and thereby allow safe disposal of the bulk of the waste as low level waste. This pre-treatment option for nuclear waste management is being implemented by many governmental agencies and independent contractors responsible for waste minimisation and the safe disposal of nuclear wastes.

Accordingly, a wide range of ion exchangers, both organic and inorganic, have been tested for potential use in pre-treatment of liquid nuclear waste.

Numerous organic (polymeric) ion exchangers are known and have been utilised to treat nuclear waste streams, with a number of these being very selective for Cs and Sr. In general however, such polymeric ion exchangers have inherently low radiation stability and are consequently not suitable for interim storage. Because of this they are widely regarded as being less favourable than inorganic systems for nuclear waste remediation.

Inorganic ion-exchangers are preferred for nuclear waste applications because inorganic materials have greater radiation stability and hence maintain their efficacy longer.

However, despite the recognised advantages of using inorganic sorbents to pre-treat liquid radioactive wastes, particularly for the uptake of $Cs^+$ and $Sr^{2+}$, there remains a need for inorganic sorbents that can simultaneously sorb practical quantities of $Cs^+$ and $Sr^{2+}$ from highly acidic aqueous streams. Such acidic waste streams which are generated through dissolution of spent nuclear fuel elements in nitric acid, are particularly relevant. Further, there is a need for reusable inorganic ion exchangers for the pre-treatment of acidic waste streams, including liquid nuclear waste, to selectively remove contaminant metal ions, thereby resulting in waste having a lower level of contamination. Such low-level waste could then be effectively disposed of with an enormous cost saving compared to the expense in disposing of non pre-treated liquid nuclear waste.

Hydrous metal oxides, including those of niobium, antimony, and tungsten, are known to sorb various cations. Most of these compounds are either amorphous to X-rays and/or do not possess well defined microporosity or surface chemistry. Microporous oxides of the above named metals are, however, known to have structures containing well defined tunnels. Of particular relevance here are those with the so-called hexagonal tungsten bronze (HTB) and pyrochlore structures shown in FIG. 1. It is important to note that in the term 'hexagonal tungsten bronze', 'hexagonal' refers to the symmetry of the unit cell while the term 'bronze' is not a structural one, but refers to the fact that the compounds often have metallic lustre. Thus, the term 'hexagonal tungsten bronze' as used herein refers to a class of compounds with the HTB or HTB-like structure which do not necessarily contain tungsten.

Certain HTB compounds are well known and have been synthesised in various ways, ranging from DC magnetron sputtering, which produces materials with the formula $WO_3$, to low temperature hydrothermal methods such as those used for zeolite preparations that yield hydrated fine particle materials with the general formula $Na_xWO_3 \cdot ZH_2O$. The latter methods usually employ acidified sodium tungstate solutions which are heated to temperatures in the range 100-300° C. to effect crystallisation.

It is here disclosed for the first time that certain HTB and pyrochlore compounds, including fine particle, hydrothermally-prepared HTB and pyrochlore compounds, are capable of selectively removing certain ions from solutions containing much higher concentrations of sodium ions, including acidic solutions. In particular it is disclosed that certain HTB and pyrochlore compounds are capable of selectively removing both Cs and Sr ions simultaneously from aqueous solutions. These properties make them useful in applications involving environmental decontamination.

OBJECTS OF THE INVENTION

It is an object of the present invention to provide a process for removing contaminant metal ions from liquids including radioactive liquid nuclear waste streams.

It is also an object of the present invention to provide an inorganic sorbent material which can be used as an ion exchanger for the selective removal of contaminant metal ions from liquids including radioactive liquid nuclear waste streams.

In particular, it is an objective of the present invention to provide a process, and one or more inorganic ion exchanger materials, for selectively removing the contaminant elements caesium and strontium from aqueous or substantially aqueous based streams including radioactive nuclear waste streams.

SUMMARY OF THE INVENTION

A first aspect of the present disclosure concerns the use of a porous group V or VI metal oxide as an ion exchanger material.

Thus, in a first embodiment the invention provides a process for at least partially removing cations of one or more metals selected from the group consisting of caesium, strontium, lead, silver, transition metals, lanthanides and actinides from an acidic liquid containing said cations, comprising contacting said liquid with an ion exchange/sorbent material in an amount and for a time sufficient to at least reduce the concentration of said cations in said liquid, wherein said material has a structure based on or closely related to a structure selected from the group consisting of hexagonal tungsten bronze, pyrochlore and mixtures thereof, and is a metal oxide composition having the empirical formula (I)

$$A_{x/n}[B_yM_{1-y}O_{3+\delta}]^x \cdot ZH_2O \qquad (I)$$

where M is one or more metals of Group Vb or VIb of the Periodic Table; A is a cation selected from the group consisting of alkali metals, alkaline earth metals, silver, ammonium, hydrogen and mixtures thereof; n is the charge on said cation A; B is one or more elements selected from the group consisting of W, Zr, Mo, V, Ti, Fe, Ce, Sb, Nb, Mn, Co, Cr, Fe, Ta, Sn and Cu, provided that M and B are different; x represents the quantity of framework charge; y is a number in the range of 0 to about 0.5; Z is a number in the range >0 to 3; and 3+δ indicates the oxygen stoichiometry.

In a second embodiment, the invention provides a process for selectively removing first cations of one or more metals selected from the group consisting of caesium, strontium, lead, silver, transition metals, lanthanides and actinides from a liquid containing said first cations and containing second cations of at least one other metal, comprising contacting said liquid with an ion exchange/sorbent material in an amount and for a time sufficient to at least reduce the concentration of said first cations, wherein said material has a structure based on or closely related to a structure selected from the group consisting of hexagonal tungsten bronze, pyrochlore and mixtures thereof, and is a metal oxide composition having the empirical formula (I)

$$A_{x/n}[B_yM_{1-y}O_{3+\delta}]^x \cdot ZH_2O \qquad (I)$$

where M is one or more metals of Group Vb or VIb of the Periodic Table; A is a cation selected from the group consisting of alkali metals, alkaline earth metals, silver, ammonium, hydrogen and mixtures thereof; n is the charge on said cation A; B is one or more elements selected from the group consisting of W, Zr, Mo, V, Ti, Fe, Ce, Sb, Nb, Mn, Co, Cr, Fe, Ta, Sn and Cu, provided that M and B are different; x represents the quantity of framework charge; y is a number in the range of from 0 to about 0.5; Z is a number in the range >0 to 3; and 3+δ indicates the oxygen stoichiometry.

It will be appreciated that in the empirical formula (I), the framework charge x is determined by the valence of the principal framework element M and the element(s) B and the oxygen stoichiometry and typically takes values from 0 to 1, more typically in the range 0 to 0.5. Z is typically in the range >0 to 3, more typically in the range 0.5 to 1.5. The quantity 3+δ in the formula indicates the oxygen stoichiometry which may vary slightly from 3 owing to the presence of framework defects such as vacancies.

In a third embodiment the invention provides a process for at least partially removing cations of one or more metals selected from the group consisting of caesium, strontium, lead, silver, transition metals, lanthanides and actinides from a liquid containing said cations, comprising contacting said liquid with a sorbent material in an amount and for a time sufficient to at least reduce the concentration of said cations, wherein said sorbent material is a metal oxide composition having the empirical formula $$A_{x/n}[B_yM_{1-y}O_{3+\delta}]^x \cdot ZH_2O$$

where M is one or more metals of Group Vb or VIb of the Periodic Table; A is a cation selected from the group consisting of alkali metals, alkaline earth metals, silver, ammonium, hydrogen and mixtures thereof; n is the charge on said cation A; B is one or more elements selected from the group consisting of W, Zr, Mo, V, Ti, Fe, Ce, Sb, Nb, Mn, Co, Cr, Fe, Ta, Sn and Cu, provided that M and B are different; x represents the quantity of framework charge; y is a number in the range of >0 to about 0.5; Z is a number in the range >0 to 3; and 3+δ indicates the oxygen stoichiometry.

In a fourth embodiment the invention provides a metal oxide composition having the empirical formula $$A_{x/n}[B_yM_{1-y}O_{3+\delta}]^x \cdot ZH_2O$$

where M is a metal of Group Vb or VIb of the Periodic Table; A is a cation selected from the group consisting of alkali metals, alkaline earth metals, silver, ammonium, hydrogen and mixtures thereof; n is the charge on said cation; B is one or more elements selected from the group consisting of W, Zr, Mo, V, Ti, Fe, Ce, Sb, Nb, Mn, Co, Cr, Fe, Ta, Sn and Cu, provided that M and B are different; x represents the quantity of framework charge; y is a number in the range of >0 to about 0.5; Z is a number in the range 0 to 3; typically >0 to 3, and 3+δ indicates the oxygen stoichiometry. When Z is 0, the compound of empirical formula (I) must be rehydrated prior to use.

In a fifth embodiment the invention provides a process for increasing the ion exchange capacity of a metal oxide composition having a structure based on or closely related to a structure selected from the group consisting of hexagonal tungsten bronze and pyrochlore, said metal oxide composition having the empirical formula $$A_{x/n}[B_yM_{1-y}O_{3+\delta}]^x \cdot ZH_2O$$

where M is one or more metals in oxidation state (VI); A is a cation selected from the group consisting of alkali metals, alkaline earth metals, silver, ammonium, hydrogen and mixtures thereof; n is the charge on said cation A; B is one or more elements selected from the group consisting of W, Zr, Mo, V, Ti, Fe, Ce, Sb, Nb, Mn, Co, Cr, Fe, Ta, Sn and Cu, provided that M and B are different; x represents the quantity of framework charge; y is a number in the range of 0 to about 0.5; Z is a number in the range >0 to 3; and 3+δ indicates the oxygen stoichiometry;

the process comprising the step of reducing at least some of the metal atoms M in said metal oxide composition to an oxidation state less than (VI).

In the processes and compositions of the invention, A, the extra framework cation, is typically $H^+$, $K^+$ or $Na^+$, and is more typically $Na^+$.

In the processes and compositions of the invention, B is typically selected from the group consisting of molybdenum, niobium, tantalum, antimony, vanadium, cerium and copper, and mixtures thereof.

It is typical that the process of the first to third embodiments is a column-based ion exchange process or a batch process.

It is typical that in the process of the first to third embodiments, the metal cation or cations is/are eluted from the sorbent material after they have been sorbed onto it, by contacting the sorbent material with a concentrated mineral acid or other suitable eluant. Typically, nitric acid is used as an eluant.

In the processes of the first to third embodiments, the metal oxide composition is typically in the form of fine particles, more typically having a size in the range of about 0.1 to about 10 microns.

Typically, the process of the first to third embodiments takes from between about 0.1 to about 100 contact hours. More typically, the contact time is from between about 0.1 to about 40 hours, most typically from between about 30 min to about 1 hour.

In the processes of the invention, the metal ion that is removed from the liquid is typically selected from the group consisting of caesium ions, strontium ions, lead ions, silver ions, transition metal ions, lanthanide metal ions and actinide metal ions and mixtures thereof. More typically, the metal ion is selected from the group consisting of caesium ions, strontium ions and mixtures thereof. In particular, the processes of the first to third embodiments of the invention and the compositions of the fourth embodiment are capable of being used to remove caesium and strontium ions simultaneously from aqueous liquids, more particularly acidic aqueous liquids.

Typically in the processes of the first to third embodiments the liquid is an aqueous or substantially aqueous based liquid. In the process of the first to third embodiments, the liquid is typically an acidic aqueous liquid, more typically having a pH of less than about 4.

In the processes of the second and third embodiments the liquid may be an organic liquid.

Metal oxides of the empirical formula (I) having a structure based on or closely related to the hexagonal tungsten bronze or pyrochlore structures may be prepared by a hydrothermal process. That is, they may be prepared by mixing solutions of the alkali metal salts (typically sodium salts) of one or more oxyacids of metals of Group Vb or Group VIb of the Periodic Table in relative molar amounts corresponding to y and (1-y), adjusting the pH to 1.5 or higher, and heating the mixture under pressure at a temperature of about 100-300° C. more typically 120-230° C., for at least 12 hours, followed by cooling and collecting the solid metal oxide composition by filtration.

More usually, the pH will be adjusted in the range of from 1.5 to 2.0 if it is desired to obtain a hexagonal tungsten bronze material or in the range of about 3.5 to 4.5 if it is desired to obtain a pyrochlore material. Adjustment to a pH in the range of 2.0 to 3.5 will typically give a mixture of hexagonal and pyrochlore structures. Even more usually, when M is W, the pH will be adjusted in the range of about 1.5 to 2.0 to obtain essentially only a hexagonal tungsten bronze structure.

Accordingly, the invention also provides a process for preparing a metal oxide composition of the empirical formula (I) as defined above, comprising preparing an aqueous solution comprising oxyanions of element(s) B and oxyanions of metal(s) M in relative molar proportions of y to (1-y); adjusting the pH to 1.5 opr higher, more typically in a range selected from (i) about 1.5 to 2.0, and (ii) about 3.5 to 4.5; heating the mixture at a temperature in the range of about 100-300° C., more typically 120-230° C., for at least 12 hours; cooling the mixture and separating the metal oxide composition from the aqueous phase.

The group Vb or VIb metal oxide has a crystal structure based on or closely related to hexagonal tungsten bronze or pyrochlore. Examples of these are shown in FIG. 1. These structures are characterized in that they have 4, 5 or 6 membered ring channels/tunnels capable of accommodating guest or exchangeable ions of suitable size. Each side of the quadrilateral, pentagonal or hexagonal channel is defined by the oxygen atoms that form part of the octahedral coordination polyhedron of the principal framework metal cation.

The term "structure based on, or closely related to" as used herein will be understood by those skilled in the art to refer to a material or phase having an ideal crystal structure of the hexagonal tungsten bronze or pyrochlore shown in FIG. 1, and to structures that are slight modifications of the ideal structures such that one skilled in the art is able to recognize in the modified structures the essential structural elements that confer membership to the ideal structural class. That is, the term "structure based on, or closely related to hexagonal tungsten bronze or pyrochlore" will be understood to mean materials of the hexagonal crystal system with a of 7.3 to 7.5 Å and c of 3.8 to 4.0 Å or to pyrochlores of the cubic crystal system with a of 10.2 to 10.6 Å.

Exemplary of such microporous oxide phases are the hexagonal bronzes or pyrochlores of tungsten, niobium, tantalum, and molybdenum. Example 3 and associated FIG. 5 compare the uptake of Cs by a selection of niobate and tungstate sorbents. The following Table 1 also provides selectivity data for Cs and Sr in solutions containing 2 ppm Cs (0.0015 mM), 0.6 ppm Sr (0.0068 mM) and 0.7 M $HNO_3$. These data were obtained by contacting 20 mL of the solution with 0.20 g of the sorbent at 25° C. over a 24 h period with occasional agitation. At the end of the contact time, an aliquot of the supernatant was extracted, filtered through 0.20 μm filter elements and analysed for Cs and Sr by Atomic Emission Spectroscopy.

Values of the distribution coefficients ($K_d$) for the various cations, which give an indication of the selectivity of the exchanger, were calculated according to the formula $$K_d = \frac{C_i - C_f}{C_f} \times \frac{V}{m}$$

in which:

V=volume of waste simulant (mL), m=mass of the exchanger (g), $C_i$=initial concentration of cation in the supernatant (g/mL), $C_f$=final concentration of cation in the supernatant (g/mL).

The $K_d$ values were calculated using the weight of the sample as synthesized.

TABLE 1

| Sorbent | $K_d$ (Cs)(mL/g) | $K_d$ (Sr) (mL/g) |
|---|---|---|
| Nb-pyrochlore | 1013 | 0 |
| W-pyrochlore | 5867 | 20 |
| $Mo_{0.5}W_{0.5}$-pyrochlore | 2038 | 21 |
| $Mo_{0.25}W_{0.75}$-pyrochlore | 3480 | 16 |
| W-HTB | 17000 | 143 |

In Table 1, the terms "Nb-pyrochlore" and "W-pyrochlore" refer respectively to compounds having the pyrochlore structure which have the formula $Na_xNbO_3 \cdot ZH_2O$ and $Na_xWO_3 \cdot ZH_2O$; the term "$Mo_yW_{(1-y)}$-pyrochlore" refers to compounds having the pyrochlore structure which have the formula $Na_xMo_yW_{(1-y)}O_3 \cdot ZH_2O$; and the term "W-HTB" refers to a compound having the hexagonal tungsten bronze structure which has the formula $Na_xWO_3 \cdot ZH_2O$.

Typically, the ion-exchange process of the first and second embodiments can employ undoped or doped crystalline microporous group Vb and VIb metal oxides such as tungsten and niobium oxides as the sorbent material. By "doped" in this context is meant a composition of empirical formula (I) in which y is non-zero.

Typically, the doped microporous tungsten or niobium oxide is a crystalline, electroactive, microporous tungstate with a modified hexagonal tungsten bronze or pyrochlore crystal structure.

More typically, the metal oxide is an optionally doped microporous tungsten oxide or optionally doped microporous niobium oxide, most typically optionally doped microporous tungsten oxide.

Typically, the microporous tungsten oxide is characterized in that it has a crystal structure that is a derivative of the hexagonal tungsten bronze structure. More typically, the microporous tungsten oxide is a crystalline, electroactive, microporous tungstate with a modified hexagonal tungsten bronze crystal structure.

In the compositions of empirical formula (I), it is typical that the value of x, and hence the quantity of contaminant sorbed, is controlled electrochemically. It is also typical that the value of x and hence the quantity of contaminant sorbed, is controlled chemically. For example, the value of x may be controlled chemically by a process of the fifth embodiment by treating a composition of empirical formula (I) with a chemical reducing agent such as hydrazine or other reducing agent either during its preparation or afterwards. Essentially any reducing agent may be used for this purpose. Examples of suitable reducing agents are oxalic acid, thiosulfates such as sodium thiosulfate, amines such as pyridine and hydroxylamine, and reducing gases such as hydrogen or carbon monoxide. Alternatively, the reducing agent may be generated in situ during the preparation of the metal oxide composition by including an amount of the metal M in its elemental form in the acidic medium in which the metal oxide is prepared. Other metallic elements that can partially or completely dissolve in the acid medium to give an oxidisable species can also be used. Examples are Fe, Cr, Zn, Cu, Ni and Ti. It will be appreciated that when a different metal to M is used for this purpose, some of the metal can be expected to be incorporated into the metal oxide composition that is prepared, by substituting for the element M.

An electrochemical reduction process according to the fifth embodiment may for example be carried out using an electrochemical cell consisting of the following:

(a) a Ag/AgCl or calomel reference electrode;

(b) a platinum or other counter electrode; and (c) a working electrode which consists of titanium metal containing a coating of the metal oxide composition sorbent. The working electrode may be prepared by standing a strip of titanium metal sheet upright in a hydrothermal reactor which is then charged with the required solutions, adjusted to the desired pH, for the preparation of the metal oxide composition as described herein. The hydrothermal reactor is heated between 150 and 200° C. and a coating of metal oxide composition is deposited on the titanium substrate.

In an exemplary electrochemical process, the electrochemical cell is charged with a suitable simulant solution such as 50 mM $CsNO_3$ in 1.0 M $HNO_3$ solution. The potential of the cell is driven from 1000 mV, where the electrode material is in the oxidised state to close to 0 mV where the electrode material is in the reduced (charged) state. In the reduced state W(VI) is largely converted to W(V) and counterions (such as $Cs^+$ or perhaps $H^+$) are required to be inserted from the solution in order to maintain electroneutrality of the sorbent. The potential is held close to 0 mV for about 20 minutes and the sorbent may be observed to change colour. After 20 minutes the cell may be disconnected and after a further 20 minutes the electrode is removed from the simulant. SEM-EDS analysis of the electrode material shows that Cs has been sorbed.

One way of modulating the ion exchange properties of the metal oxide sorbent material is by changing B. For instance the specific composition with A=Na, B=Mo and y=0.1 confers particularly high selectivity for Cs and Sr, and also particularly high capacity in acidic solutions. Accordingly, it is typical that the metal oxide used in the processes of the first, second and third embodiments of the present invention has the formula $A_{x/n}[B_yM_{1-y}O_{3+\delta}]^{x-} \cdot ZH_2O$ where A is an extra framework exchangeable cation such as sodium or potassium, and B is a dopant element such as Mo, V, Ti. In the metal oxide sorbent materials of empirical formula (I), y is typically greater than 0, more typically from about 0.05 to about 0.3, even more typically from about 0.05 to 0.2, still more typically from about 0.1 to about 0.2.

Typical embodiments of the invention employ metal oxide compositions of the above formula $A_{x/n}[B_yM_{1-y}O_{3+\delta}]^{x-} \cdot ZH_2O$ in which B=Mo, A=Na and y=about 0.05 to about 0.3, more typically 0.5 to 0.2, still more typically about 0.1 to about 0.2.

Typically, the metal oxide has an X-ray diffraction pattern with at least one broad peak at a d-spacing between 14 and 18 Å.

One embodiment of the present invention relates to oxides of the empirical formula (I) where the dopant B has the effect of modifying the structure in such a way as to improve the ion-exchange properties. The nature of the structural modification can involve a distortion, and/or dislocation, and/or disordering, and/or the presence of a second minor phase which is intimately related to the major phase such as an intergrowth and/or changes in surface chemistry/charge. Accordingly, one aspect of the present disclosure relates to the modification of the hexagonal tungsten bronze structure so as to optimise the capacity and selectivity for sorption of cationic species, especially caesium and strontium, from aqueous waste streams, especially acidic ones. For instance, such modification may involve controlled reduction (eg induced chemically, electrochemically, optically or in a radiation field) and associated generation of reduced framework W(V) sites, by a process of the fifth embodiment. Alternatively, low-valency species (e.g. Ti(IV), Mn(II) etc) may be incorporated directly into the framework so as to increase the framework charge.

The ability to elute the contaminant ions from the exchanger using strong acid is an important feature of the present invention.

The present invention is based on the unexpected discovery that tungsten bronzes and pyrochlores can be applied to the decontamination of waste streams, especially nuclear waste streams. Improvement of the ion exchange properties of tungsten bronzes and pyrochlores resulting from a chemical modification of structural order and/or framework/surface chemistry brought about through compositional adjustment and/or framework reduction is also an important feature discovered by the present inventor on which the present invention is premised.

BRIEF DESCRIPTION OF THE DRAWINGS

Preferred embodiments of the present invention will now be described by way of example with reference to the accompanying drawings wherein:

FIG. 9b shows the selectivity for Cs and Sr ion-exchange of the compounds shown in FIG. 9a.

FIG. 10b shows the selectivity for Cs and Sr ion-exchange of the compounds shown in FIG. 10a.

DETAILED DESCRIPTION OF THE PREFERRED EMBODIMENTS

Figure 1:
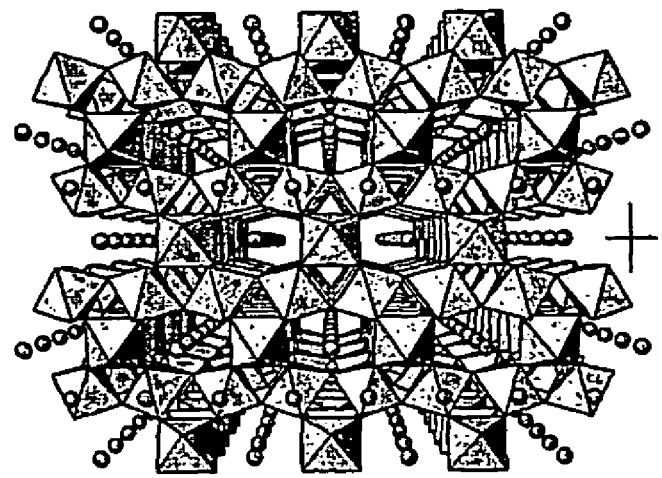
FIG. 1 illustrates the framework structures of (a) pyrochlore, and (b) hexagonal tungsten bronze (HTB).
Figure 1:
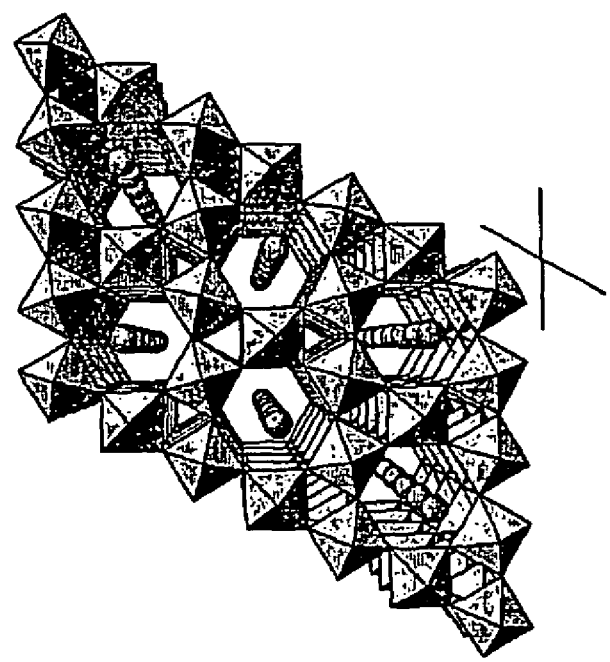

It is disclosed for the first time that microporous tungsten, niobium and other related compounds whose structure is one of those, or is closely related, to one of those shown in FIG. 1 selectively exchange ions such as $Cs^+$ and $Sr^{2+}$. This is demonstrated in Example 3 where it is made apparent that Nb and W pyrochlore compounds, in addition to W tungsten bronze compounds, selectively sorb Cs and Sr even when there is a large excess of Na present.

Moreover, the microcrystalline compounds of the present invention display a heretofore unexpected tunability in their ion exchange properties. For instance, altering B in the empirical formula $A_{x/n}[B_yM_{1-y}O_{3+\delta}]^x\cdot ZH_2O$ alters the selectivity of the ion exchanger for A, while altering the redox state of the ion exchanger compound by changing x modifies both selectivity and capacity. For example, with B (in the formula) corresponding to Mo, these microcrystalline oxides are particularly effective in removing caesium and strontium ions from acidic aqueous streams. The contaminant metal ions sorbed on the exchanger can be eluted using $HNO_3$ solutions and the ion exchanger reused.

In contrast, compositions in which B is V, Cu, Cr, Zr, or Ce (see Examples 7-10) result in pejoration of Cs and Sr ion exchange properties of the compositions compared to the undoped material. Alternatively, or additionally, ion exchange properties can be modulated by changing x through reductive treatment of the framework. This can be accomplished either by a chemical means, using various reducing agents, by optically driven methods, or by electrochemical means, using an electrochemical cell.

In unmodified form the hexagonal tungsten bronze compounds being described here, and having the framework shown in FIG. 1b as their basis, give the powder x-ray diffraction pattern shown in FIG. 2a. The unmodified structure is characterized by intense reflections with d-spacings of 6.3, 3.9, 3.2, and 2.46 Å in addition to many less intense reflections. This structure can be modified by incorporating various other elements, indicated as B, which form an intimate relationship with the tungsten-oxygen framework of the native compound according to the following idealised formula:

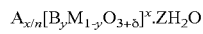

$$A_{x/n}[B_yM_{1-y}O_{3+\delta}]^x\cdot ZH_2O$$

with the variables in this formula having the values as defined above and including the possibility of using two or more species for each of A and B. For example, it is possible to include both Na and K as extra framework cations A, and Mo, Ti and V as co-dopants B.

In the present invention, materials with the above characteristics have been modified, with beneficial consequences, for example by including the element Mo for B and arranging y to be between 0.05 and 0.25 as per Example 1. These compositions are particularly effective at simultaneously, and selectively, sorbing $Cs^+$ and $Sr^{2+}$ from waste streams with pH values ranging from −0.3 to 13 as shown in Example 4. A distinguishing feature of preferred compounds of the present invention is that the compounds possess a very broad low-angle reflection with a d-spacing of 14 to 18 Å (FIG. 2c). The major reflections of the unmodified form continue to be observed in the x-ray diffraction patterns, but with reduced intensity. It is to be understood however, that other metal oxide compositions having empirical formula (I) defined above can be prepared with similar features in the X-ray diffraction patterns and with similar beneficial consequences to the sorption of contaminant ions.

When certain other B elements are involved, such as vanadium, the X-ray diffraction patterns are not modified in the manner just described and improvement in ion exchange properties compared to the corresponding undoped material does not result in the case of $Sr^{2+}$ and $Cs^+$.

Due to their approximately 3 Å channel size, the crystalline materials of this invention are capable of separating water and other small molecules from larger molecular species, and can thus be used as desiccants, gas drying agents, as well as in separations of ammonia and hydrogen from gas streams.

The compositions of the fourth embodiment of the present invention are capable of selective ion-exchange of various contaminant metal ions from liquid streams such as aqueous streams thereby removing these metals from the liquid streams. Illustrative of the contaminant metal ions which can be removed from liquid streams are caesium, strontium, silver, lead, transition metal ions, lanthanide metal ions and actinide metal ions. These metal ions can be removed from the liquid stream by contacting the stream with the metal oxide composition of the fourth embodiment for a time sufficient to remove the metal ions and immobilise them on the metal oxide composition. The contacting can be carried out either in a batch mode or in a continuous mode. In a batch mode, the desired metal oxide composition is placed in an appropriate container and the stream to be treated is mixed therewith. Contacting is carried out for a time of about 0.1 to about 100 hr until a desired amount of uptake of the metal ions has occurred or until the metal oxide composition takes up no more of the metal ions. In a continuous mode, the metal oxide composition is placed in a column and the stream to be treated is flowed through it, usually downflow, until the contaminant metal is detected in the effluent of the column.

EXAMPLES

Example 1

A. Preparation of $Na_xMo_yW_{1-y}O_{3+\delta}/ZH_2O$ hexagonal tungsten bronze compounds To prepare compounds with y=0.1, 29.13 g of 1.0 M $Na_2WO_4.2H_2O$ and 3.02 g of 1.0M $Na_2MoO_4.2H_2O$ solutions were transferred to a container equipped with a magnetic stirrer. To the stirred solution was added 1.0 M HCl until a pH of between 1.5 and 2.0 was reached. The clear solution was then transferred to a Teflon lined autoclave and heated at 120-230° C. for a period exceeding 12 h. The product was then separated by vacuum filtration, washed with copious amounts of milli-Q water, and dried in an oven at a temperature from 50 to 100° C.

Elemental analysis (SEM/EDS) showed that this material had the composition: $Na_{0.2}Mo_{0.1}W_{0.9}O_3.H_2O$. This material will be referred to hereinafter as "$Mo_{0.1}W_{0.9}$-HTB".

Formulations with differing values of y were obtained by reacting the quantities of starting solutions given in the Table below.

| y | Moles of $Na_2WO_4 \cdot 2H_2O$ | Moles of $Na_2MoO_4 \cdot 2H_2O$ | grams | grams of 1.0 M $Na_2MoO_4 \cdot 2H_2O$ |
|---|---|---|---|---|
| 0 | 0.02589 | 0 | 32 | 0 |
| 0.05 | 0.0246 | 0.00129 | 30.820 | 1.503 |
| 0.10 | 0.0233 | 0.00259 | 29.195 | 3.019 |
| 0.15 | 0.0220 | 0.00388 | 27.566 | 4.522 |
| 0.20 | 0.0207 | 0.00518 | 25.962 | 6.037 |

Figure 2:
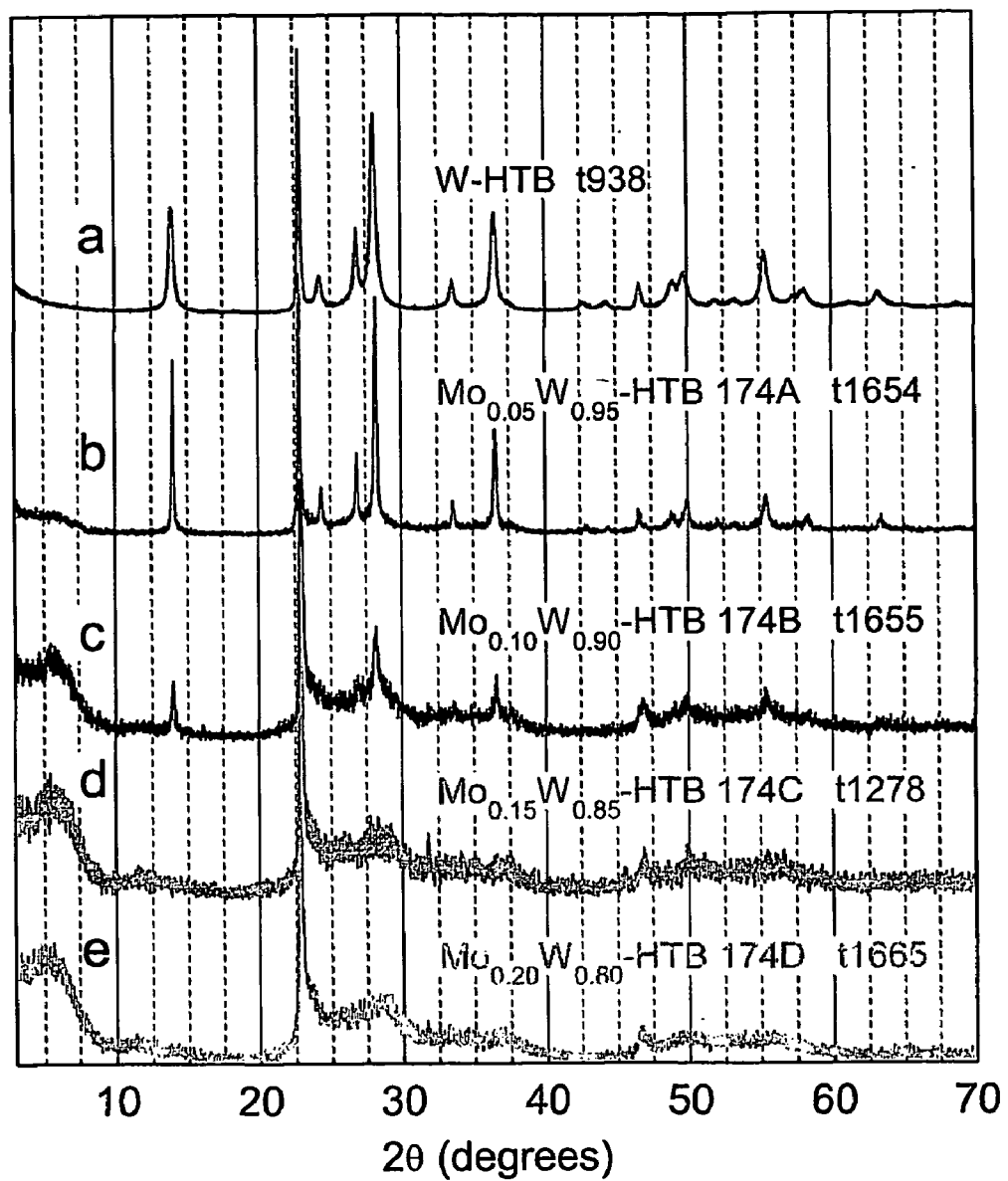
FIG. 2 shows powder X-ray diffraction patterns of unmodified and modified tungsten bronze-based ion exchangers.
Figure 3A:
FIGS. 3a, 3b, and 3c show TEM images of the unmodified and modified tungsten bronze-based ion exchangers and demonstrates the fibrous morphologies of the unmodified and modified forms.
Figure 3B:
Figure 3C:

The X-ray diffraction patterns of the resulting samples are shown in FIG. 2. Samples of the products with y=0 and 0.10 were analyzed by Transmission Electron Microscopy (TEM) to obtain the general crystallite sizes and morphologies and lattice images of the crystals. The TEM images are shown in FIG. 3 and demonstrate that the fibrous morphologies of the unmodified and modified forms are very similar.

B. Preparation of Nb-pyrochlore (i) Using $Nb_2O_5$ as Nb Precursor and HF as a Mineralizing Agent To a solution of 14.89 g of NaOH (0.37 mole) dissolved in 80.0 g water was added 10.84 g (0.0816 mol Nb) of $Nb_2O_5$. Then 19.27 g of 40% HF was added and the mixture was loaded into a Teflon lined autoclave which was sealed and heated at 200° C. for about one week.

(ii) Using Nb-ethoxide as Nb Precursor and No Mineralizing Agent

About 7 mL of ethanol was added to 9.069 g of Nb-ethoxide (0.0285 mole Nb). This solution was then added to a solution consisting of 5.2 g of NaOH in 27.9 g of water. The mixture was loaded into a Teflon lined autoclave which was sealed and heated at 200° C. for about one week.

C. Preparation of W-pyrochlores

Using a similar procedure to that described in Example 1A, $Mo_{0.25}W_{0.75}$-pyrochlore and $Mo_{0.1}W_{0.9}$-pyrochlore were obtained from $Na_2MoO_4.2H_2O$ and $Na_2WO_4.2H_2O$ by heating at 200° C. and a pH of 4.0.

Example 2

Batch Ion-Exchange of $Na_xMo_yW_{1-y}O_{3+\delta}.ZH_2O$ Compounds

Samples of each of the compounds of Example 1 with different y values were tested to determine their ability to sorb caesium and strontium, by determining the caesium and strontium distribution coefficients ($K_d$) as follows.

Two hundred milligram quantities of sample were placed into separate 50 mL plastic vials. To the vials were added 20 mL of a solution containing 100 ppm Cs (0.75 mM); 66 ppm Sr (0.75 mM); 200 ppm Na (9.0 mM Na); 1M $HNO_3$. The contaminant concentrations are comparable to those often encountered in typical nuclear waste streams. The vial was capped and occasionally shaken while maintaining the temperature at 25° C. After remaining in contact with the contaminant solution for 24 h the powder material was allowed to settle. The supernate liquid was filtered with a 0.2 µm membrane filter and then analyzed for Cs and Sr by graphite furnace atomic absorption spectroscopy.

Figure 4:
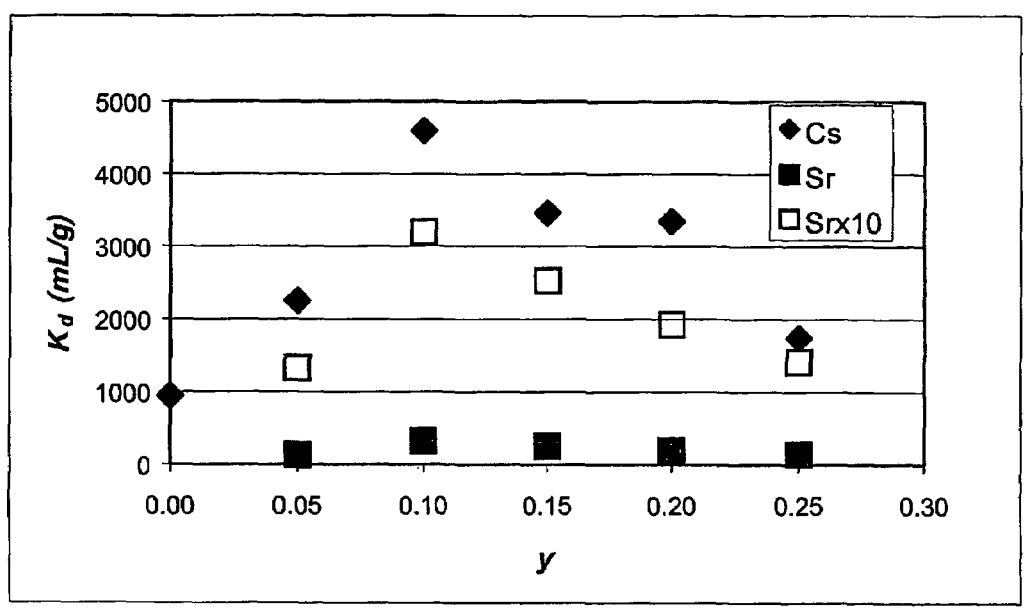
FIG. 4 is a graph showing the dependence of ion-exchange selectivity on Mo content of tungsten bronze-based materials, the $K_d$ values being plotted as a function of y in the graph.

The $K_d$ values obtained using this simulant are plotted as a function of x in FIG. 4, which shows that both $Cs^+$ and $Sr^{2+}$ are sorbed strongly and that the extent of decontamination peaked for the compound with y=0.1. The uptake for the exchanger with y=0.1 compares favourably with other inorganic sorbents and the compositions of the present invention also sorb significant amounts $Sr^{2+}$ under the given conditions.

Example 3

Capacity for Cs Sorption of Different Structure Types and Compositions.

Figure 5:
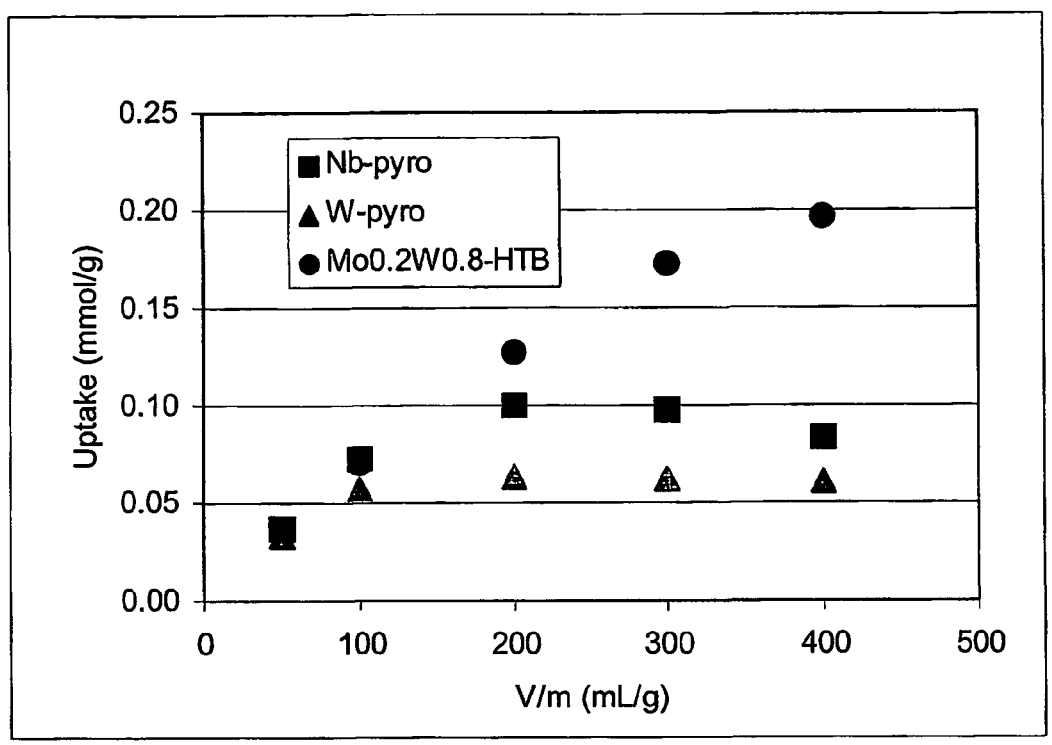
FIG. 5 shows Cs uptake for different pyrochlore and bronze compounds in a simulant with composition, 0.75 mM Cs; 0.75 mM Sr; 90 mM Na; 1.0 M $HNO_3$.

Nb- and W-based compounds whose X-ray diffraction pattern corresponds to that of a pyrochlore material were synthesized as described in Example 1B and 1C by raising the pH of the reactant solution to about 4. The ion-exchange capacities of these compounds were compared to that of a tungsten bronze-based exchanger with y=0.2 which produced less than optimum selectivity in Example 2. The amount of Cs present in solution after contacting 0.200 g of the exchangers with increasing volumes of a solution having composition 0.75 mM Cs; 0.75 mM Sr, 90 mM Na; 1.0 M $HNO_3$ for 24 hours was determined by ICP-MS analysis and the uptake in mmol/g of exchanger was plotted as a function of V/m (V=volume of solution, m=mass of exchanger) in FIG. 5. This example demonstrates that although the pyrochlore phases have some capacity for Cs sorption, the performance of the bronze-based material with y=0.2 is superior.

Example 4

Effect of pH on Selectivity

In this example the influence of pH on the Cs selectivity of the $Mo_{0.1}W_{0.9}$-HTB sorbent is demonstrated. Simulant solutions contained 0.75 mM Cs (100 mg/L), 1.14 mM Sr (100 mg/L); 87 mM (2000 mg/L) Na, with $HNO_3$ or NaOH being added to adjust aliquots to various pH values. To separate vials containing 0.20 g of the sorbent were added 20 mL portions of the simulant solution with various pH values. The solutions were agitated occasionally at room temperature over a 24 h period and then aliquots were extracted and filtered. The solutions were analysed for Cs and Sr using ICP-MS and the concentrations were compared to those of the simulant in order to determine the Kd values.

Figure 6:
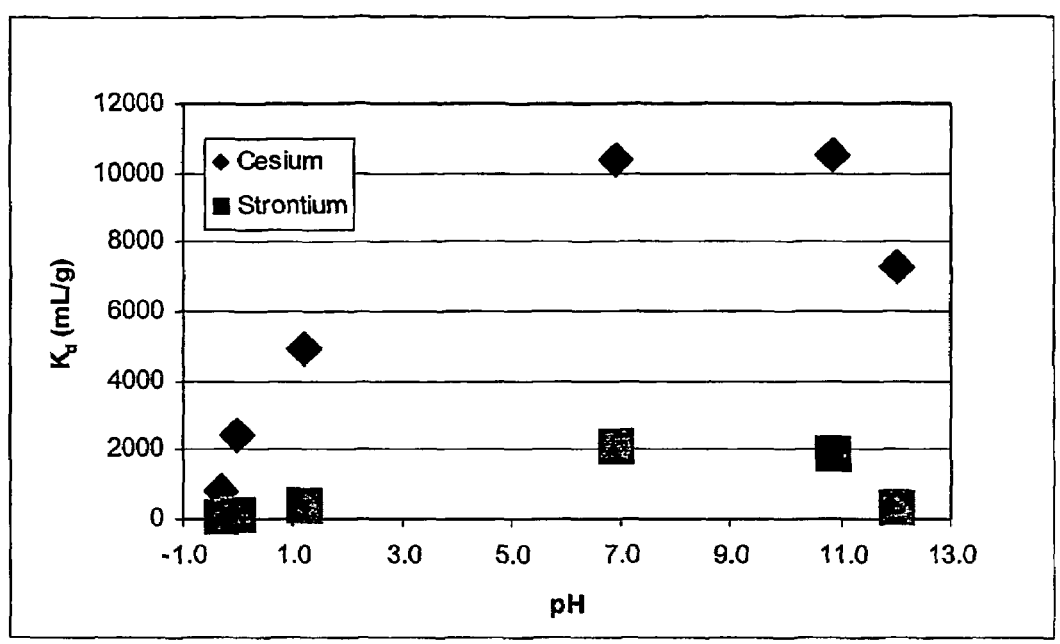
FIG. 6 is a graph showing the pH dependence of selectivity for caesium and strontium of hexagonal tungsten bronze material of formula $Na_xMo_{0.1}W_{0.9}O_{3+\delta}$.

The data of FIG. 6 show that the selectivity is optimized at pH values between 7 and 11. Above pH 12 the $K_d$ value decreases dramatically, possibly due to dissolution of the sorbent. Importantly, even at the lowest pH values significant Cs and Sr uptake occurred.

Example 5

A. Effect of Reduction of the Sorbent During Synthesis

In this example the degree of reduction of the sorbent is altered by the addition of hydrazine during the preparation of the undoped sorbent according to Example 1.

The pH of a 1.0 M sodium tungstate solution was lowered to 1.72 using 1 M HCl. 35 mL of the pH adjusted solution was loaded into separate Teflon lined autoclaves. No hydrazine was added to the first of the autoclaves and 1 and 2 drops of hydrazine hydrate were added to the second and third autoclaves, respectively. The autoclaves were sealed and heated to 150° C. for two days. After reaction the sorbent was isolated by filtration, washed and dried at 70° C. The unreduced sorbent was pale yellow-green in colour and the reduced samples were deep blue with the intensity of the coloration depending on the amount of hydrazine used during the synthesis.

Figure 7:
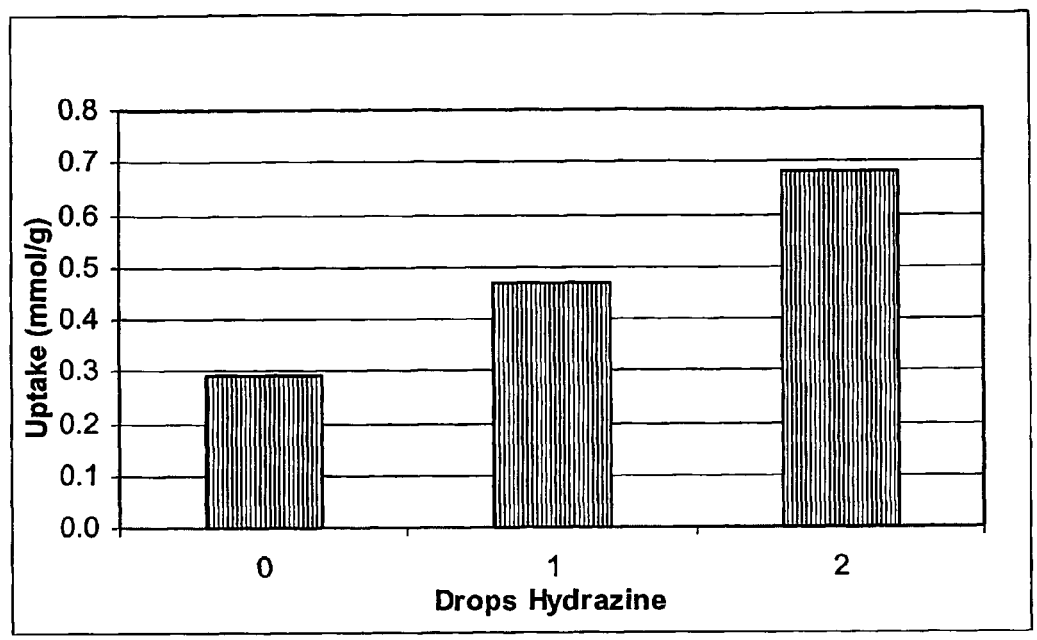
FIG. 7 is a graph showing the effect of reduction of hexagonal tungsten bronze on its ion exchange capacity.

The ion exchange capacities of the resulting sorbent powders were measured by adding 20 mL of a simulant solution that consisted of 30 mM Cs (3987 mg/L), 0.20 mol/L Na (4600 ppm) in 1M $HNO_3$ (pH=0.21) to 0.20 g of the freshly prepared sorbent. After agitating these solutions for 24 h at 25° C. an aliquot of solution was removed and this was filtered through 0.2 μm filter elements and analysed for Cs using ICP-MS. The data in FIG. 7 shows that increasing reduction of the sorbent results in a significant increase in Cs uptake by the sorbent.

B. Use of Tungsten Metal as a Reductant

In a similar series of experiments 2, 5, 10, and 50 mg of tungsten metal was added to each of four autoclaves containing 35 mL of the solution used to prepare the $Mo_{0.1}W_{0.9}$-HTB sorbent as per Example 1. Reaction was carried out at 155° C. for 2 days then the autoclave was cooled and the solid product was filtered, washed and dried at 70° C. The ion exchange capacity of the samples was determined soon after preparation in a similar manner to that described in example 5A but using simulant solutions consisting of 30 mM Cs (3987 mg/L) in 1M $HNO_3$. The results of these experiments are shown in the following table.

| mg W metal | Capacity (mmol/g) |
| --- | --- |
| 2 | 0.263 |
| 5 | 0.369 |
| 10 | 0.564 |
| 50 | 0.179 |

C. Reduction During Sorption

In this example the undoped W-HTB sorbent is reduced during the ion exchange step.

0.20 g of the undoped sorbent was placed in two separate vials and 20 mL of 50 mM $CsNO_3$ solution in 1.0 M $HNO_3$ was added. To one vial was added three drops of hydrazine hydrate. The vials were initially agitated and then left for 24 h with occasional further agitation at room temperature. Aliquots of the supernatant liquid were extracted and the solution was filtered and analysed for Cs by ICP-MS.

The Cs uptake was increased from 0.19 mmol/g in the absence of reducing agent to 0.29 mmol/g for the vial containing the reducing agent. While in-situ reduction was achieved using a particular reducing agent it is apparent that any other reducing agent would also be expected to bring about a similar increase in capacity.

Example 6

Figure 8A:
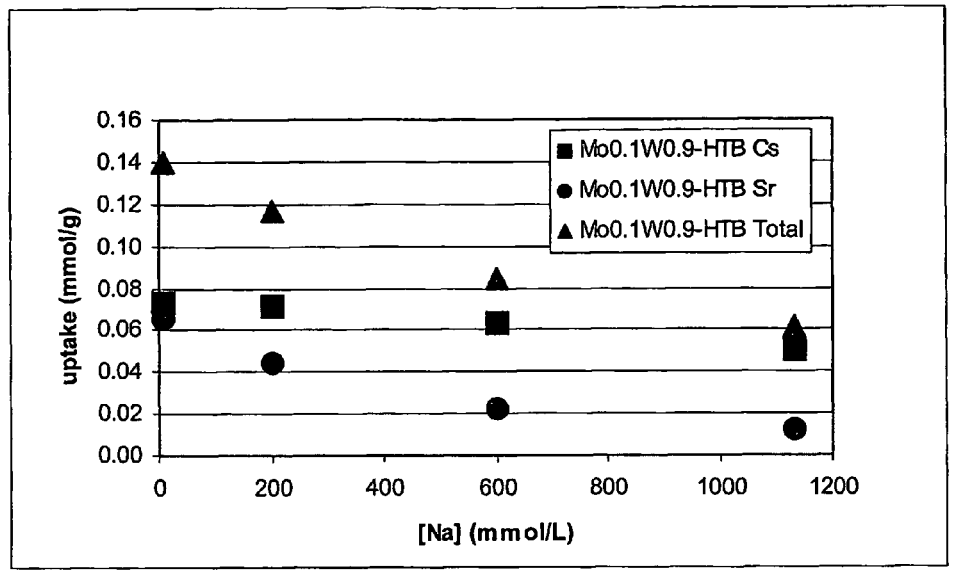
FIGS. 8a and 8b show the uptake of contaminant species in mmol per gram of exchanger for a molybdenum tungstate bronze-based exchanger.
Figure 8B:
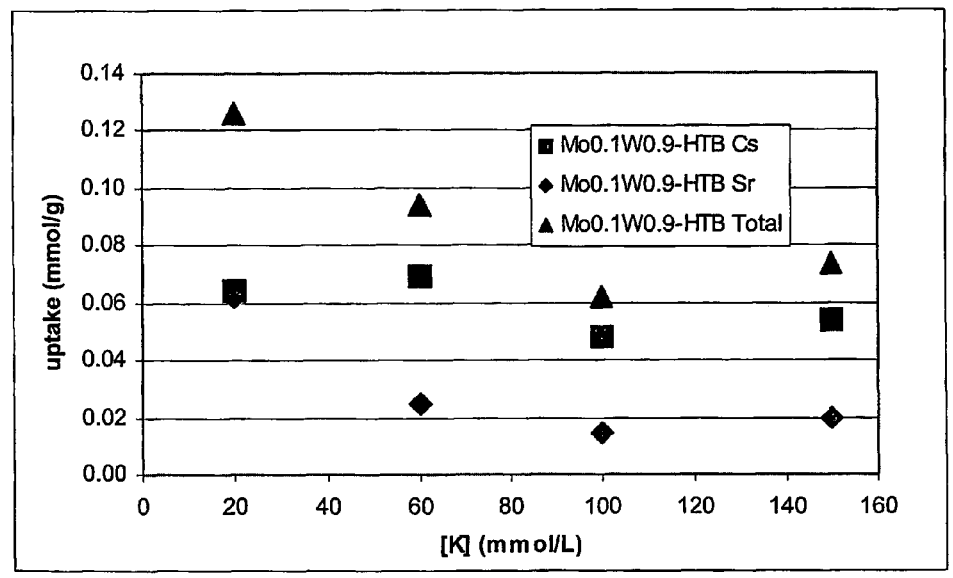

Batch Ion-Exchange of $Na_xMo_yW_{1-y}O_{3+\delta}\cdot ZH_2O$ Compounds with y=0.1 as a Function of Added Na A sample of the exchanger with y=0.1 from Example 1 was used to determine the effect of $Na^+$ concentration in the waste stream on the exchanger's ability to sorb caesium and strontium. The tests were based on the batch method described in Example 2. The contaminant solution contained 100 ppm Cs (0.75 mM $CsNO_3$); 66 ppm Sr (0.75 mM $Sr(NO_3)_2$); and variable Na concentration in 1M $HNO_3$. This tests the ability of the exchanger to sorb the contaminant ions by measuring the uptake of contaminant in mmol per gram of exchanger, even in the presence of high concentrations of competing $Na^+$ and $K^+$. The results are shown in FIG. 8 and highlight that the present embodiment of the invention is highly effective for the removal of both contaminants, especially at low Na concentrations.

Example 7

Preparation of $Na_xCu_yW_{1-y}O_{3+\delta}\cdot ZH_2O$ Hexagonal Tungsten Bronze Compositions In this Example samples were prepared in a similar manner to Example 1 except that 1.0 M $Cu(NO_3)_2\cdot 3H_2O$ solution instead of sodium molybdate was added to the tungstate solution whereupon a precipitate formed. Addition of 1.0 M HCl caused the precipitate to redissolve. The final pH was adjusted in the range 1.5 to 2 using 1.0 M HCl.

| Y | Moles Na$_2$WO$_4$·2H$_2$O | moles Cu | g 1.0 M Na$_2$WO$_4$·2H$_2$O | g Cu(NO$_3$)$_2$·3H$_2$O |
|---|---|---|---|---|
| 0.05 | 0.0246 | 0.00129 | 30.76 | 1.48 |
| 0.10 | 0.0233 | 0.00259 | 29.135 | 2.971 |
| 0.15 | 0.0220 | 0.00388 | 27.516 | 4.456 |
| 0.20 | 0.0207 | 0.00518 | 25.90 | 5.941 |

The ion exchange capabilities of the Cu-doped compounds obtained by this process were investigated by contacting a small amount (0.20 g) of the sorbent with 20 mL of a solution containing 100 ppm Cs (0.75 mM); 66 ppm Sr (0.75 mM); 2000 ppm Na (0.09 mol/L) in 1.0 M HNO$_3$. The solutions were agitated over a period of 24 h at 25° C. At the end of this period the supernatant was filtered through a 0.2 μm filter element and analysed for Cs and Sr using ICP-MS. The results of these ion exchange experiments are given in the table below.

| y | K$_d$ (Cs) (mL/g) | K$_d$ (Sr) (mL/g) |
|---|---|---|
| 0.05 | 79.9 | 11.1 |
| 0.10 | 86.7 | 9.1 |
| 0.15 | 110.5 | 12.3 |
| 0.20 | 254.0 | 31.1 |
| 0.25 | 115.8 | 23.7 |
| 0.30 | 166.7 | 31.6 |

Example 8

Preparation of Na$_x$Nb$_y$W$_{1-y}$O$_{3+\delta}$·ZH$_2$O Hexagonal Tungsten Bronze Compositions The Nb-containing precursor solution was prepared by dissolving 6.758 g NbCl$_5$ in 5.241 g ethanol, to give a final solution that contained 2.084×10$^{-3}$ moles Nb/g. To prepare the composition with y=0.1, 1.243 g of the Nb precursor was added to 29.135 g of 1.0M Na$_2$WO$_4$.2H$_2$O solution in a container equipped with a magnetic stirrer. To the stirred solution was added 1.0 M HCl until a pH of between 1.5 and 2.0 was reached. The clear solution was then transferred to a teflon lined autoclave and heated at 120-230° C. for a period exceeding 12 h. The product was then separated by vacuum filtration, washed with copious amounts of milli Q water, and dried in an oven at a temperature of 50 to 100° C.

| y | Moles Na$_2$WO$_4$·2H$_2$O | moles Nb | g 1.0 M Na$_2$WO$_4$·2H$_2$O | g Nb-chloroethoxide |
|---|---|---|---|---|
| 0.05 | 0.0246 | 0.00129 | 30.76 | 0.619 |
| 0.10 | 0.0233 | 0.00259 | 29.135 | 1.243 |
| 0.15 | 0.0220 | 0.00388 | 27.516 | 1.864 |
| 0.20 | 0.0207 | 0.00518 | 25.90 | 2.485 |

Example 9

Batch Ion-Exchange of Na$_x$V$_y$W$_{1-y}$O$_{3+\delta}$·ZH$_2$O

Figure 9A:
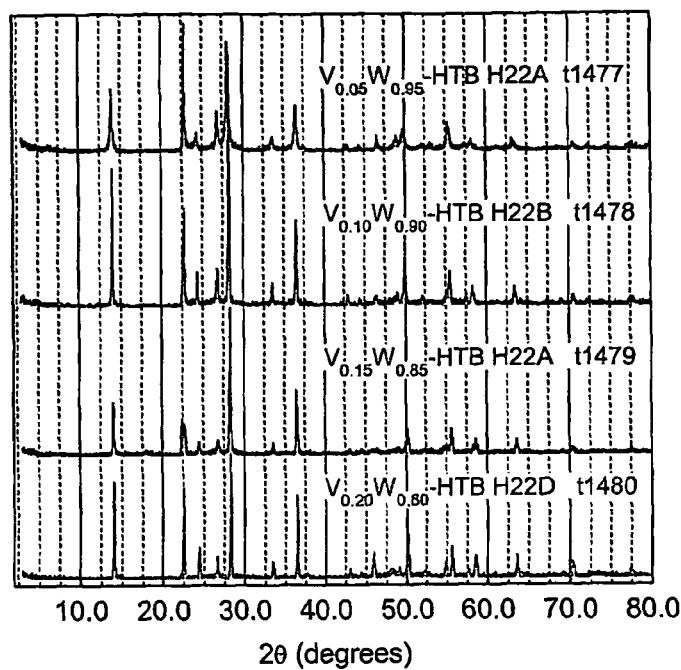
FIG. 9a shows the XRD patterns of $Na_xV_yW_{1-y}O_{3+\delta}\cdot ZH_2O$ compositions.
Figure 9B:
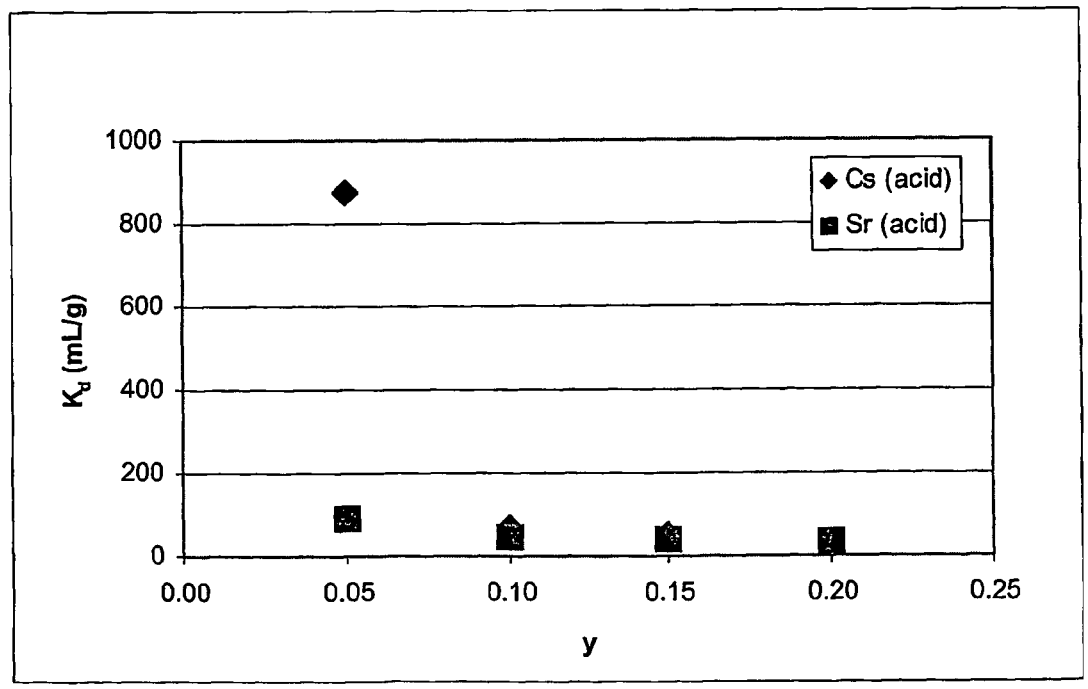

Compounds with composition Na$_x$V$_y$W$_{1-y}$O$_{3+\delta}$·ZH$_2$O and y=0.05 to 0.2 were prepared by the method of Example 1. The XRD patterns of these phases are shown in FIG. 9a which demonstrates that crystalline materials are produced for all values of y. The ion exchange properties (selectivity) of these V-doped tungstate bronze compounds were evaluated using the same simulant as in Example 2. Their selectivities for Cs and Sr ion-exchange are shown in FIG. 9b. The low-angle XRD peak at a d-spacing of 14-18 Å is absent in this case.

Example 10

Batch Ion-Exchange of Na$_x$Ce$_y$W$_{1-y}$O$_{3+\delta}$·ZH$_2$O

Figure 10A:
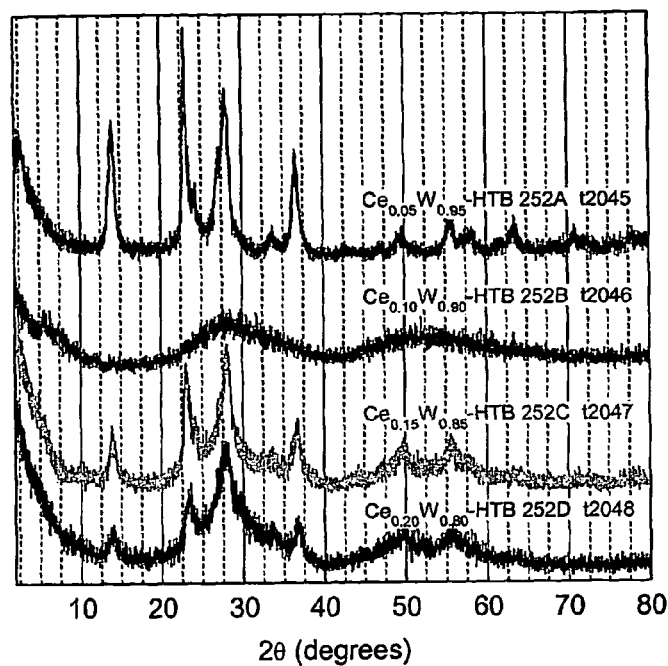
FIG. 10a shows the XRD patterns of $Na_xCe_yW_{1-y}O_{3+\delta}\cdot ZH_2O$ compositions.
Figure 10B:
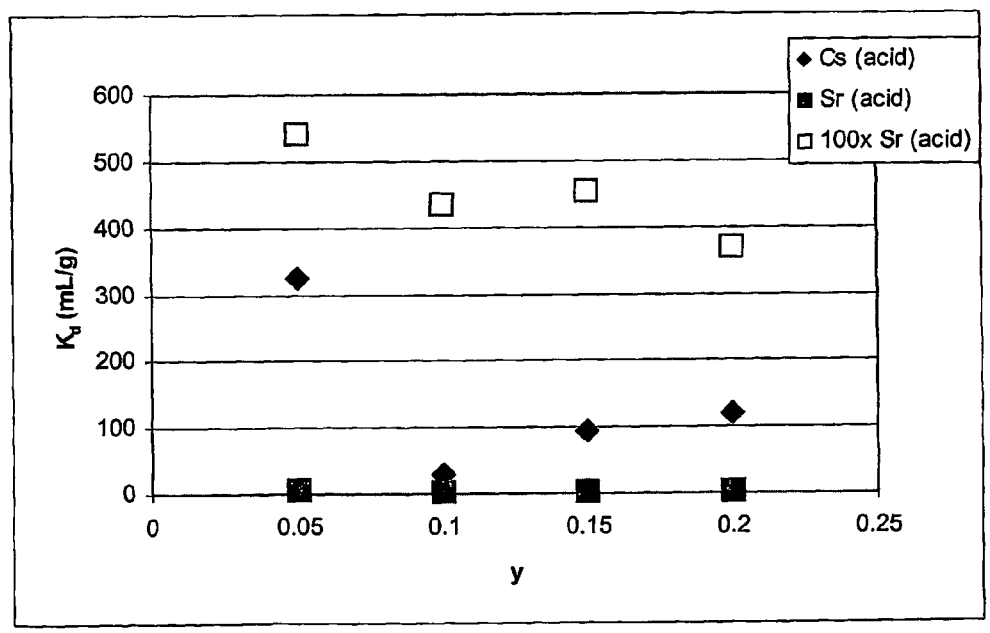

With Ce as the dopant, poorly crystalline materials (FIG. 10a) were obtained using synthetic methods similar to those described in Example 1A and using (NH$_4$)$_2$Ce(NO$_3$)$_6$ as the Ce source. The ion exchange properties of these Ce-doped tungstate bronze compounds were evaluated using the same simulant as in Example 2. Their selectivities for Cs and Sr in acid conditions are shown in FIG. 10b. The low-angle XRD peak at a d-spacing of 14-18 Å is absent in this case.

Example 11

Sorption Kinetics

Figure 11:
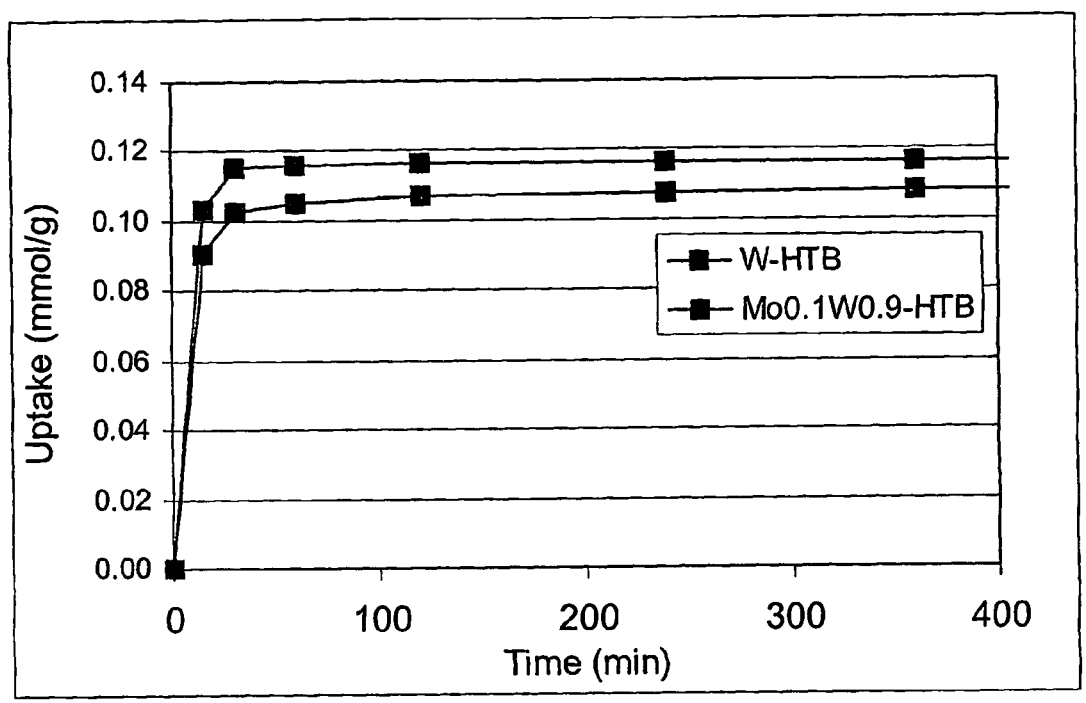
FIG. 11 shows a plot of Cs sorption as a function of time for undoped and Mo-doped tungstate bronze-based exchanger.

This Example shows that the tungstate bronze-type ion exchangers are able to sorb Cs rapidly from acidic solutions. To two flasks were added 1 g of the Mo$_{0.1}$W$_{0.9}$-HTB and undoped tungstate exchanger (W-HTB) and then 100 mL of a solution containing 160 ppm Cs (1.2 mmol/L) and 100 ppm (1.14 mmol/L) Sr in 1.0 M HNO$_3$ was added. The solutions containing the solid exchanger were stirred magnetically and 10 mL aliquots of the suspension were removed at various time intervals. The solids were separated by filtration through 0.2 μm filter elements and the solutions analysed for Cs and Sr by ICP-MS. Plots of Cs sorbed as a function of time are shown in FIG. 11. It is apparent that 90% of the maximum Cs sorption is achieved within the first 15 minutes of contact and that within the first 30 minutes the amount of Cs sorbed reaches a maximum.

Example 12

Elutability of the Exchanger

Figure 12:
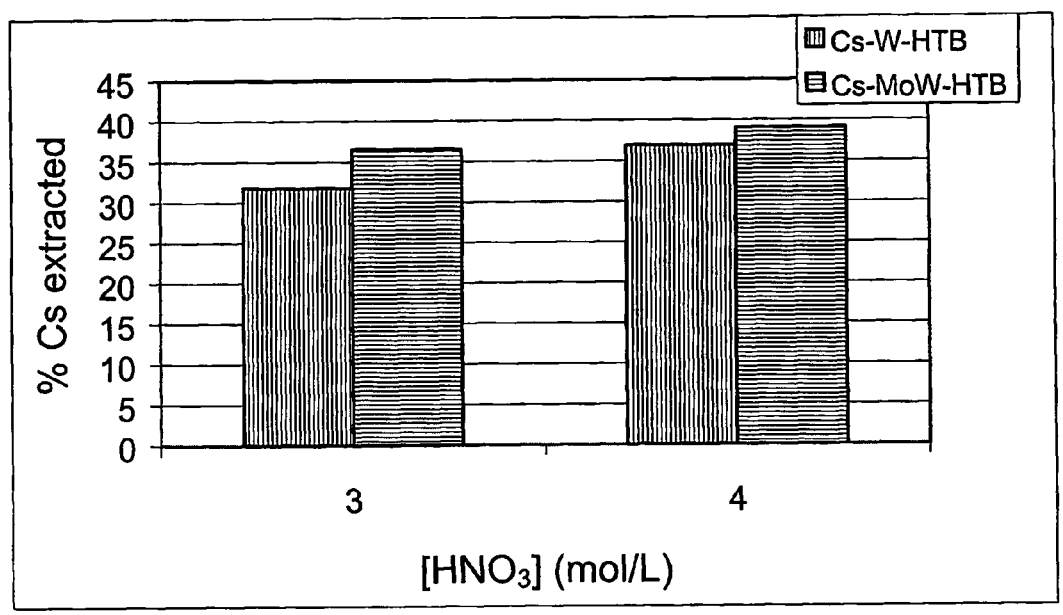
FIG. 12 shows the release of Cs from Cs-loaded undoped and Mo-doped tungstate as a function of $HNO_3$ concentration.

This Example demonstrates the elutability of the present ion-exchangers in solutions with various acid concentrations. The exchanger is initially saturated with Cs by reacting about 1 g of the powdered exchanger with about 100 mL of 50 mM CsNO$_3$ in 1 M HNO$_3$, for a period of about 24 h. The exchanger was then separated from the contaminant stream by vacuum filtration, washed with milli-Q water to remove weakly adsorbed Cs, and dried at 70° C. In these experiments, the exchanger loading typically exceeded 0.2 mmol/g for the undoped exchanger and 0.5 mmol/g for the Mo-doped composition. Two separate 0.20 g batches of the Cs-loaded undoped and Mo-doped exchanger were then contacted with 20 mL portions of 3 and 4 mol/L HNO$_3$ solution respectively under static conditions. Aliquots of the acidic supernatant solution were extracted and filtered, and the Cs concentration analyzed by ICP-MS. The results in FIG. 12 indicate that up to 40% of the Cs can be eluted from the exchanger in a single batch experiment using a volume/mass ratio of 100.

Example 13

Elutability of Contaminant

Figure 13:
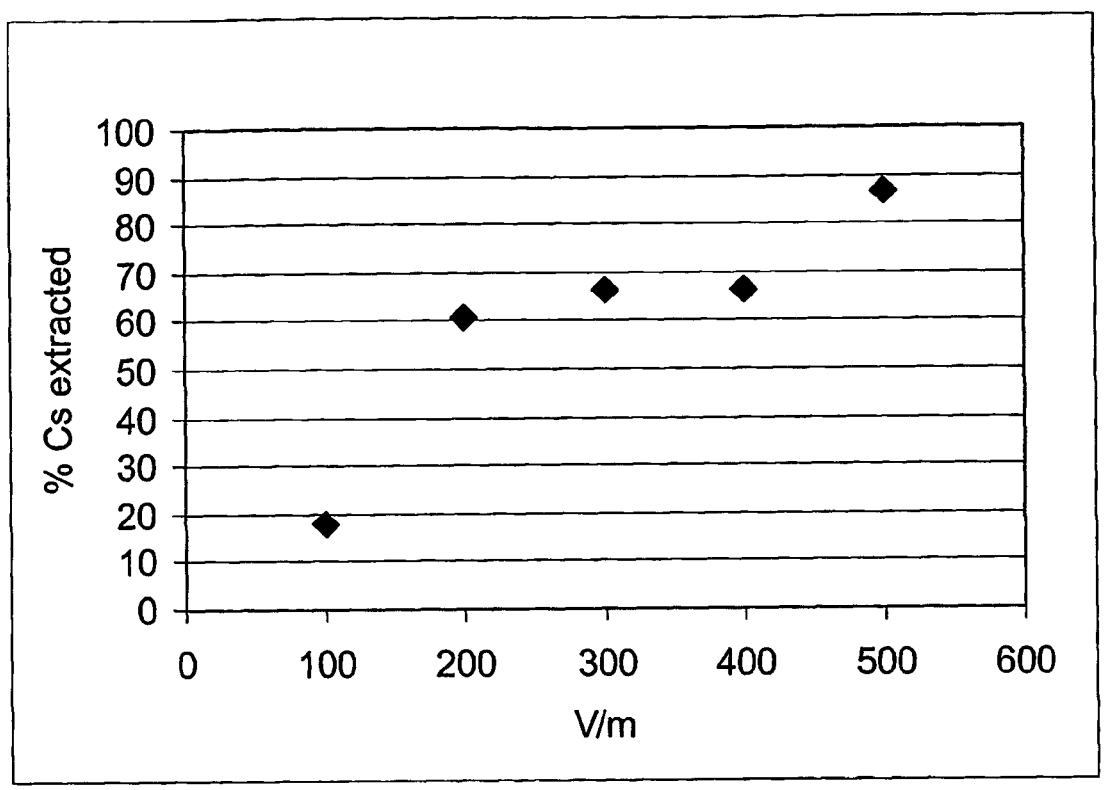
FIG. 13 shows the release of Cs from Cs-loaded Mo-doped tungsten bronze-based exchanger as a function of volume of 3M $HNO_3$ concentration.

This example is similar to Example 10 except the elutability is tested as a function of the amount of 3 M HNO$_3$ added. The Mo-doped exchanger is initially saturated with Cs in the manner described in Example 10. Separate 0.20 g batches of the Cs-loaded Mo-doped exchanger were then contacted with 3 mol/L $HNO_3$ solutions to give volume/mass ratios in the range 100-500. Aliquots of the supernatant acid solution were extracted, filtered, and the Cs concentration analyzed by ICP-MS. The results in FIG. 13 indicate that up to 90% of the Cs can be eluted from the exchanger in a single batch experiment using a volume/mass ratio of 500.

Example 14

Reversibility of Ion-Exchange

This Example demonstrates the reversible nature of the cation sorption in the present materials. A sample of $Mo_{0.1}W_{0.9}WO_3 \cdot H_2O$ in the sodium form was treated with a 20 mM solution of $CsNO_3$ in 1 M $HNO_3$ so as to replace all the $Na^+$ on the exchange sites with $Cs^+$. This process resulted in a $Cs^+$ uptake of 0.5 mmol Cs per gram of exchanger. The exchanger was then eluted with 3 M $HNO_3$ with the volume of acid corresponding to a volume/mass ratio of 250. This process resulted in the extraction of 0.24 mmol Cs per g of the saturated exchanger or about 48% of the Cs, as expected from Example 10. After drying, the exchanger was then treated once again with the original acidic 20 mM $CsNO_3$ solution, which resulted in a Cs uptake of 0.24 mmol Cs per g of exchanger. In other words, all of the Cs removed during the elution step was replaced by contacting the exchanger with the original Cs solution.

Example 15

Application to Non-Nuclear Industrial Waste Streams

This Example demonstrates the uptake of various metal cations from highly acidic solutions. To 0.20 g of the $Mo_{0.1}W_{0.9}$-HTB exchanger was added 20 mL of a solution containing about 100 ppm of the desired metal cation as a nitrate salt in 1 M $HNO_3$. After contacting for a period of 24 h the supernatant solution was removed and analyzed by ICP-MS.

| Metal Cation | Uptake (mmol/g) | $K_d$ (mL/g) | % extracted |
|---|---|---|---|
| $Rb^+$ | 0.051 | 188 | 65 |
| $Cr^{3+}$ | 0.038 | 60 | 38 |
| $Mn^{2+}$ | 0.045 | 53 | 35 |
| $Co^{2+}$ | 0.044 | 71 | 42 |
| $Ni^{2+}$ | 0.031 | 52 | 34 |
| $Cu^{2+}$ | 0.046 | 81 | 45 |
| $Ru^{2+}$ | 0.006 | 3 | 4 |
| $Pb^{2+}$ | 0.088 | 11820 | 99 |
| $Ag^{+\#}$ | 0.117 | 115990 | 100 |
| $Cd^{2+}$ | 0.053 | 107 | 52 |
| $La^{3+}$ | 0.061 | 349 | 78 |
| $Ce^{4+}$ | 0.06 | 460 | 82 |
| $Nd^{3+}$ | 0.097 | 644 | 87 |

The exchange of $Ag^+$ was carried out in the dark to prevent precipitation of silver oxide.

Example 16

Mercury Poisoning

An important concern regarding application in the nuclear waste conditioning industry is the possibility of poisoning of the exchanger by the small quantities of $Hg^{2+}$ which are present in many nuclear wastes. The Hg is used as a catalyst in the dissolution of the spent nuclear material. To 0.20 g of the molybdenum-containing bronze-based exchanger with y=0.2 prepared in Example 1A was added 20.0 mL of a solution containing 0.75 mM Cs; 0.75 mM Sr; 9.0 mM Na; 1.0 M $HNO_3$. After 24 hours of contact with occasional shaking the supernatant was removed and analyzed for Cs and Sr and the selectivity and uptake were measured to be 4609 mL/g and 0.076 mmol/g respectively for Cs. A similar experiment was conducted using the above simulant spiked with 0.5 mM $Hg^{2+}$. The selectivity and uptake were found to be 5305 mL/g and 0.076 mmol/g. These values are very similar to those obtained in the absence of Hg. Therefore, it can be concluded that the bronze-based exchangers are not poisoned by Hg.

Example 17

Continuous Batch Process

This example demonstrates that the preferred embodiments of the invention can be used to remove Cs and Sr simultaneously from simulant solutions that contain much higher concentrations of Na in 1 M $HNO_3$. It also demonstrates that the efficacy of the separation is maintained over extended periods of time.

Figure 14:
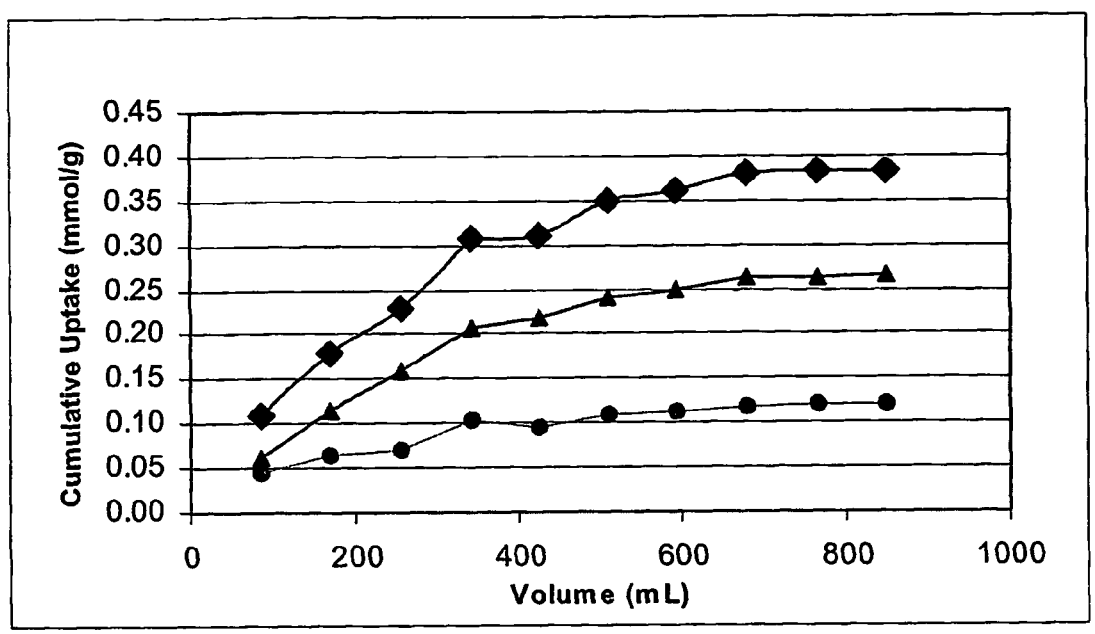
FIG. 14 shows the cumulative uptake of Cs, Sr by $Mo_{0.1}W_{0.9}$-HTB as a function of simulant liquid volume in a continuous batch process.

To 1.0 g of $H^+$-exchanged $Mo_{0.1}W_{0.9}$-HTB was added 85.0 mL of a simulant that consisted of 100 ppm $Cs^+$ (0.75 mM), 66 ppm $Sr^+$ (0.75 mM), 2000 ppm $Na^+$ (0.09 mol/L), in 1M $HNO_3$. This was stirred briefly (~30 min) then the solid was allowed to settle overnight, the supernatant was removed, and the solution was filtered through 0.2 μm filter elements and analysed for Cs and Sr by ICP-MS. The uptake of Cs and Sr by the sorbent as a function of the volume of simulant used is shown in FIG. 14, in which triangles represent Cs uptake; circles represent Sr uptake and diamonds represent total uptake.

Example 18

Removal of Radionuclides from Actual Intermediate Level Waste

The radioactive waste liquid that was tested contained the following approximate quantities of major elements: 8.15 g/L U; 2 mg/L Cs; 0.6 mg/L Sr; 0.061 g/L Fe; 0.016 g/L Mg; 0.088 g/L Al; small quantities of Ce; in 0.70 M $HNO_3$.

To 0.10 g of $Mo_{0.1}W_{0.9}$-HTB was added 5.0 g of radioactive waste solution. The solid and radioactive solutions were left in contact for 24 hours with occasional agitation and then an aliquot was taken of the supernatant liquid which was filtered through an 0.2 μm filter element. The activity attributed to the relevant radionuclides was determined by standard radiation counting methods and through comparison with the untreated liquid waste.

| Radionuclide | Removal Efficiency % |
|---|---|
| $^{137}Cs$ | 99.7 |
| $^{90}Sr$ | 94 |
| $^{144}Ce$ | 96.3 |

The amount of $^{137}Cs$ removed was determined using γ-ray detector and the $^{90}Sr$ and $^{144}Ce$ were determined using scintillation counting. This example demonstrates that the sorbent performs well even in the presence of a radiation field.

Example 19

Lead Sorption from Acidic Solution

In some acidic sulfate-containing fluid streams such as those found in mining operations, the presence of Pb and associated elements presents an environmental concern.

This Example was designed to demonstrate the ability of a process of the present invention to function in such media. Thus, one gram of air-dried $Mo_{0.1}W_{0.9}$-HTB and $Mo_{0.1}W_{0.9}$-PYRO sorbent were each contacted with 100 mL of a 10 ppm Pb solution in 0.15 M $H_2SO_4$. A 10 mL aliquot of the solution plus suspended solid was periodically extracted so as to leave the solution/solid ratio constant. The aliquot was filtered through a 0.2 μm filter and analysed by ICP-AES.

The sorbents were shown have a high affinity for Pb which affinity remains constant over long periods of time. Specifically, the lead concentration was measured to be less than 1 mg/L in the solution in contact with both sorbents, over a period of from 1.74 hours to 185.5 hours.

Example 20

Ion Exchange Properties of Zirconium-Containing Hexagonal Tungsten Bronze Compositions.

Various hexagonal tungsten bronze compositions were prepared by a similar procedure to that described in Example 1A. The compositions (0.20 g each) were contacted with 20 mL of a simulant solution having the following composition: 100 ppm Cs(0.75 mM), 66 ppm Sr(0.75 mM), 2000 ppm Na(90 mM), 1M $HNO_3$ and the following results were obtained.

| Composition | Cs Kd (mL/g) | Cs uptake (mmol/g) | Sr Kd (mL/g) | Sr uptake (mmol/g) |
|---|---|---|---|---|
| $Zr_{0.05}W_{0.95}$HTB | 242.5 | 0.058 | 12.8 | 0.009 |
| $Zr_{0.10}W_{0.90}$HTB | 338.1 | 0.064 | 19.9 | 0.013 |
| $Zr_{0.15}W_{0.85}$HTB | 200.4 | 0.055 | 13.1 | 0.009 |
| $Zr_{0.20}W_{0.80}$HTB | 163.6 | 0.051 | 10.6 | 0.008 |

Example 21

Ion Exchange Properties of Chromium-Containing Hexagonal Tungsten Bronze Compositions.

Various hexagonal tungsten bronze compositions were prepared by a similar procedure to that described in Example 1A. The compositions (0.20 g each) were contacted with 20 mL of a simulant solution having the following composition: 100 ppm Cs(0.75 mM), 66 ppm Sr(0.75 mM), 2000 ppm Na(90 mM), 1M $HNO_3$ and the following results were obtained.

| Composition | Cs Kd (mL/g) | Cs Uptake (mmol/g) | Sr Kd (mL/g) | Sr Uptake (mmol/g) |
|---|---|---|---|---|
| $Cr_{0.02}W_{0.98}$HTB | 361.2 | 0.063 | 26.7 | 0.016 |
| $Cr_{0.05}W_{0.95}$HTB | 337.6 | 0.063 | 39.2 | 0.022 |
| $Cr_{0.10}W_{0.90}$HTB | 291.2 | 0.060 | 41.4 | 0.023 |
| $Cr_{0.15}W_{0.95}$HTB | 158.6 | 0.050 | 35.3 | 0.020 |
| $Cr_{0.20}W_{0.80}$HTB | 347.4 | 0.063 | 43.2 | 0.023 |

The invention claimed is:

1. A process for at least partially removing cations of one or more metals selected from the group consisting of cesium, strontium, lead, silver, transition metals, lanthanides and actinides from an acidic liquid containing said cations, comprising contacting said liquid with an ion exchange/sorbent material in an amount and for a time sufficient to at least reduce the concentration of said cations in said liquid, wherein said material has a structure selected from the group consisting of hexagonal tungsten bronze, pyrochlore and mixtures thereof, and is a metal oxide composition having the empirical formula (I)

$$A_{x/n}[B_y M_{1-y} O_{3+\delta}]^x \cdot ZH_2O \quad (I)$$

where M is one or more metals of Group Vb or VIb of the Periodic Table; A is a cation selected from the group consisting of alkali metals, alkaline earth metals, silver, ammonium, hydrogen and mixtures thereof; n is the charge on said cation A; B is one or more elements selected from the group consisting of W, Zr, Mo, V, Ti, Fe, Ce, Sb, Nb, Mn, Co, Cr, Fe, Ta, Sn and Cu, provided that M and B are different; x represents the quantity of framework charge; y is a number in the range of 0 to 0.5; Z is a number in the range >0 to 3; and 3+δ indicates the oxygen stoichiometry.

2. A process according to claim 1 wherein said metal M is selected from the group consisting of tungsten, niobium and mixtures thereof.

3. A process according to claim 1 wherein said acidic liquid is an aqueous liquid having a pH of less than 4.

4. A process according to claim 1 wherein said sorbent material has a hexagonal tungsten bronze structure.

5. A process according to claim 1 wherein B is selected from the group consisting of Mo, Nb, V, Ce and Cu.

6. A process according to claim 1 wherein said sorbent material has a hexagonal tungsten bronze structure and y is in the range of from >0 to 0.3.

7. A process according to claim 6 wherein B is Mo, M is W and y is from 0.1 to 0.2.

8. A process according to claim 6 wherein said at least partially removed cations are selected from the group consisting of cesium cations, strontium cations and mixtures thereof.

9. A process for selectively removing first cations of one or more metals selected from the group consisting of cesium, strontium, lead, silver, transition metals, lanthanides and actinides from a liquid containing said first cations and containing second cations of at least one other metal, comprising contacting said liquid with an ion exchange/sorbent material in an amount and for a time sufficient to at least reduce the concentration of said first cations, wherein said material has a structure selected from the group consisting of hexagonal tungsten bronze, pyrochlore and mixtures thereof, and is a metal oxide composition having the empirical formula (I)

$$A_{x/n}[B_y M_{1-y} O_{3+\delta}]_x \cdot ZH_2O \quad (I)$$

where M is one or more metals of Group Vb or VIb of the Periodic Table; A is a cation selected from the group consisting of alkali metals, alkaline earth metals, silver, ammonium, hydrogen and mixtures thereof; n is the charge on said cation A; B is one or more elements selected from the group consisting of W, Zr, Mo, V, Ti, Fe, Ce, Sb, Nb, Mn, Co, Cr, Fe, Ta, Sn and Cu, provided that M and B are different; x represents the quantity of framework charge; y is a number in the range of from 0 to 0.5; Z is a number in the range >0 to 3; and 3+δ indicates the oxygen stoichiometry.

10. A process according to claim 9 wherein said metal M is selected from the group consisting of tungsten, niobium and mixtures thereof.

11. A process according to claim 9 wherein said material has a hexagonal tungsten bronze structure.

12. A process according to claim 9 wherein B is selected from the group consisting of Mo, Nb, V, Ce and Cu, and y is >0.

13. A process according to claim 9 wherein said sorbent material has a hexagonal tungsten bronze structure and y is in the range of from >0 to 0.3.

14. A process according to claim 13 wherein B is Mo, M is W and y is from 0.1 to 0.2.

15. A process according to claim 13 wherein said first cations are selected from the group consisting of cesium cations, strontium cations and mixtures thereof.

16. A metal oxide composition with a structure selected from the group consisting of hexagonal tungsten bronze and pyrochlore and having the empirical formula $$A_{x/n}[B_yM_{1-y}O_{3+\delta}]^x \cdot ZH_2O$$

where M is a metal of Group Vb or VIb of the Periodic Table; A is a cation selected from the group consisting of alkali metals, alkaline earth metals, silver, ammonium, hydrogen and mixtures thereof; n is the charge on said cation; B is one or more elements selected from the group consisting of W, Zr, Mo, V, Ti, Fe, Ce, Sb, Nb, Mn, Co, Cr, Fe, Ta, Sn and Cu, provided that M and B are different; x represents the quantity of framework charge; y is a number in the range of >0 to 0.5; Z is a number in the range 0 to 3; and 3+δ indicates the oxygen stoichiometry.

17. A composition according to claim 16 having a hexagonal tungsten bronze structure.

18. A composition according to claim 16 wherein M is selected from the group consisting of tungsten, niobium and mixtures thereof.

19. A composition according to claim 16 wherein B is selected from the group consisting of Mo, Nb, V, Ce and Cu, and y is >0.

20. A composition according to claim 16 wherein said sorbent material has a hexagonal tungsten bronze structure and y is from 0.05 to 0.3.

21. A composition according to claim 20 wherein B is Mo, M is W and y is from 0.1 to 0.2.

22. A composition according to claim 16 wherein δ is zero.

23. A process for at least partially removing cations of one or more metals selected from the group consisting of cesium, strontium, lead, silver, transition metals, lanthanides and actinides from a liquid containing said cations, comprising contacting said liquid with a sorbent material in an amount and for a time sufficient to at least reduce the concentration of said cations, wherein said sorbent material is a metal oxide composition having the empirical formula $$A_{x/n}[B_yM_{1-y}O_{3+\delta}]^x \cdot ZH_2O$$

where M is one or more metals of Group Vb or VIb of the Periodic Table; A is a cation selected from the group consisting of alkali metals, alkaline earth metals, silver, ammonium, hydrogen and mixtures thereof; n is the charge on said cation A; B is one or more elements selected from the group consisting of W, Zr, Mo, V, Ti, Fe, Ce, Sb, Nb, Mn, Co, Cr, Fe, Ta, Sn and Cu, provided that M and B are different; x represents the quantity of framework charge; y is a number in the range of >0 to 0.5; Z is a number in the range >0 to 3; and 3+δ indicates the oxygen stoichiometry.

24. A process according to claim 23 wherein M is selected from the group consisting of tungsten, niobium and mixtures thereof.

25. A process according to claim 23 wherein said metal oxide composition has a structure selected from the group consisting of hexagonal tungsten bronze and pyrochiore.

26. A process according to claim 23 wherein B is selected from the group consisting of Mo, Nb, V. Ce and Cu.

27. A process according to claim 23 wherein said sorbent material has a hexagonal tungsten bronze structure and y is from 0.05 to 0.3.

28. A process according to claim 27 wherein B is Mo, M is W and y is from 0.1 to 0.2.

29. A process according to claim 23 wherein said at least partially removed cations are selected from the group consisting of cesium cations, strontium cations and mixtures thereof.

30. A process according to claim 11 wherein said liquid is an aqueous liquid.

31. A process according to claim 30 wherein said aqueous liquid is an acidic liquid.

32. A process according to claim 30 wherein said aqueous liquid is an alkaline liquid.

33. A process for increasing the ion exchange capacity of a metal oxide composition having a structure selected from the group consisting of hexagonal tungsten bronze and pyrochlore, said metal oxide composition having the empirical formula $$A_{x/n}[B_yM_{1-y}O_{3+\delta}]^x \cdot ZH_2O$$

where M is one or more metals in oxidation state (VI); A is a cation selected from the group consisting of alkali metals, alkaline earth metals, silver, ammonium, hydrogen and mixtures thereof; n is the charge on said cation A; B is one or more elements selected from the group consisting of W, Zr, Mo, V, Ti, Fe, Ce, Sb, Nb, Mn, Co, Cr, Fe, Ta, Sn and Cu, provided that M and B are different; x represents the quantity of framework charge; y is a number in the range of 0 to 0.5; Z is a number in the range >0 to 3; and 3+δ indicates the oxygen stoichiometry;

the process comprising the step of reducing at least some of the metal atoms M in said metal oxide composition to an oxidation state less than (VI).

34. A process according to claim 33, wherein said reducing step is a chemical reduction step.

35. A process according to claim 34, wherein said chemical reduction step comprises treating said metal oxide composition with hydrazine.

36. A process according to claim 33, wherein M is tungsten.

37. A process according to claim 33, wherein y is 0.

38. An ion exchange material prepared by the process of claim 33.

39. A process for preparing a metal oxide composition according to claim 16, comprising preparing an aqueous solution comprising oxyanions of element(s) B and oxyanions of metal(s) M is relative molar proportions of y to (1-y); adjusting the pH to 1.5 or higher; heating the mixture at a temperature in the range of 100-300° C. for at least 12 hours; cooling the mixture and separating the metal oxide composition from the aqueous phase.

40. A metal oxide compound with a structure selected from the group consisting of hexagonal tungsten bronze and pyrochlore and having the empirical formula $$A_{x/n}[B_yM_{1-y}O_{3+\delta}]^x \cdot ZH_2O$$

where M is a metal of Group Vb or VIb of the Periodic Table; A is a cation selected from the group consisting of alkali metals, alkaline earth metals, silver, ammonium, hydrogen and mixtures thereof n is the charge on said cation; B is one or more elements selected from the group consisting of W, Zr, Mo, V, Ti, Fe, Ce, Sb, Nb, Mn, Co, Cr, Fe, Ta, Sn and Cu, provided that M and B are different; x represents the quantity of framework charge; y is a number in the range of >0 to 0.5; Z is a number in the range 0 to 3; and 3+$\delta$ indicates the oxygen stoichiometry.

41. A compound according to claim 40 having a hexagonal tungsten bronze structure.

42. A compound according to claim 40 wherein M is selected from the group consisting of tungsten, niobium and mixtures thereof.

43. A compound according to claim 40 wherein B is selected from the group consisting of Mo, Nb, V, Ce and Cu, and y is >0.

44. A compound according to claim 40 wherein said sorbent material has a hexagonal tungsten bronze structure and y is from 0.05 to 0.3.

45. A compound according to claim 44 wherein B is Mo, M is W and y is from 0.1 to 0.2.

46. A compound according to claim 40 wherein $\delta$ is zero.

47. A process according to claim 23 wherein said liquid is an aqueous liquid.

48. A process according to claim 47 wherein said aqueous liquid is an acidic liquid.

49. A process according to claim 47 wherein said aqueous liquid is an alkaline liquid.

* * * * *